US009876558B2

(12) United States Patent
Ishihara et al.

(10) Patent No.: US 9,876,558 B2
(45) Date of Patent: Jan. 23, 2018

(54) RELAY DEVICE, COMMUNICATION SYSTEM, AND RELAYING METHOD

(71) Applicant: KABUSHIKI KAISHA TOSHIBA, Tokyo (JP)

(72) Inventors: Takeshi Ishihara, Kanagawa (JP); Hiroshi Nishimoto, Kanagawa (JP); Kouichi Takimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/853,174

(22) Filed: Sep. 14, 2015

(65) Prior Publication Data

US 2016/0080068 A1    Mar. 17, 2016

(30) Foreign Application Priority Data

Sep. 16, 2014  (JP) ................................. 2014-188218

(51) Int. Cl.
*H04W 4/00* (2009.01)
*H04B 7/15* (2006.01)
(Continued)

(52) U.S. Cl.
CPC ........... *H04B 7/15* (2013.01); *H04L 67/1095* (2013.01); *H04L 67/1097* (2013.01); *H04L 67/2842* (2013.01); *H04W 12/06* (2013.01)

(58) Field of Classification Search
CPC .............................. H04W 84/12; H04W 76/06
(Continued)

(56) References Cited

U.S. PATENT DOCUMENTS 6,874,017 B1   3/2005  Inoue et al.
7,277,942 B2  10/2007  Inoue et al.
(Continued)

FOREIGN PATENT DOCUMENTS

JP    2000-276425    10/2000
JP    2003-069639     3/2003
(Continued)

OTHER PUBLICATIONS

Ishihara et al., U.S. Appl. No. 14/847,328, filed Sep. 8, 2015.
(Continued)

*Primary Examiner* — Tu X Nguyen
(74) *Attorney, Agent, or Firm* — Nixon & Vanderhye, P.C.

(57) ABSTRACT

According to one embodiment, a relay device that relays communication between an information request device which requests information and an information providing device which provides requested information. The relay device includes an interface to receive a signal transmitted by the information request device. The relay device includes a first circuitry to perform, using the signal, at least one of connection management of a network, authentication of the information request device, and authentication of a user of the information request device. The relay device includes a second circuitry to control allocation of storage areas included in a storage device, or an available range within which information saved in the storage area is able to be provided, when the first circuitry detects establishment of a connection to the network, disconnection of the connection, an authentication result, or a lapse of a valid connection time period.

17 Claims, 19 Drawing Sheets

(51) Int. Cl.
*H04L 29/08* (2006.01)
*H04W 12/06* (2009.01)

(58) Field of Classification Search
USPC .............................................. 455/514, 435.1
See application file for complete search history.

(56) References Cited

U.S. PATENT DOCUMENTS

| | | | |
|---|---|---|---|
| 7,814,483 B2 | 10/2010 | Li et al. | |
| 8,849,351 B2* | 9/2014 | Burgess | H04W 76/021 |
| | | | 455/435.1 |
| 2001/0051525 A1* | 12/2001 | Rayne | H04W 8/085 |
| | | | 455/453 |
| 2003/0053458 A1 | 3/2003 | Okazaki | |
| 2006/0120326 A1 | 6/2006 | Takeuchi et al. | |
| 2008/0132280 A1* | 6/2008 | Kobayashi | H04W 76/028 |
| | | | 455/561 |
| 2010/0057924 A1 | 3/2010 | Rauber et al. | |
| 2012/0295664 A1* | 11/2012 | Walker | H04W 8/20 |
| | | | 455/561 |
| 2013/0095789 A1* | 4/2013 | Keevill | H04W 12/06 |
| | | | 455/411 |
| 2016/0081003 A1 | 3/2016 | Ishihara et al. | |

FOREIGN PATENT DOCUMENTS

| | | |
|---|---|---|
| JP | 2003-263359 | 9/2003 |
| JP | 2004-348495 | 12/2004 |
| JP | 2006-165928 | 6/2006 |
| JP | 2006-171822 | 6/2006 |
| JP | 2007-521541 | 8/2007 |
| JP | 2011-151541 | 8/2011 |
| JP | 2016-063315 | 4/2016 |
| WO | 2005/048011 | 5/2005 |

OTHER PUBLICATIONS

Jacobson, V. et al., "Networking Named Content," CoNEXT 2009, Rome, Dec. 2009, pp. 1-12.
English-language machine translation of JP2003-263359.
English-language machine translation of JP2004-348495.
English-language machine translation of JP2006-171822.
English-language machine translation of JP2011-151541.

* cited by examiner

RELAY DEVICE, COMMUNICATION SYSTEM, AND RELAYING METHOD

CROSS-REFERENCE TO RELATED APPLICATIONS

This application is based upon and claims the benefit of priority from Japanese Patent Application No. 2014-188218, filed Sep. 16, 2014; the entire contents of which are incorporated herein by reference.

FIELD

Embodiments described herein relate to a relay device, a communication system, and a relaying method.

BACKGROUND

Wireless communications represented by IEEE 802.11 have been in widespread use. In these communications systems, in order to connect communications via wireless to a backend network constructed by wired communication technologies, relay devices called access points, base stations, or the like are used. The access points function as bridges that connect different networks in the data link layer, the role of which is to relay frames between a wireless side and a wired side, or to relay frames between different wireless communication scheme. At this point, the access point does not save the frames for a long time, and the received frames are immediately transferred to a network being a relay destination.

In contrast, there has been proposed a communications system that has a caching function of temporarily save data relayed by routers and bridges on a network, so as to treat chunks of semantic information as the core of transmission (Content-Centric Networking: CCN). In this scheme, when a user intends to acquire desired information, the nearest cache is selected from among a plurality of caches existing in a network, and a wireless terminal having a wireless communication function receives the information transmitted from the nearest cache.

However, with the prior art, the use efficiency of a cache may deteriorate because of no method of adjusting cache areas.

DETAILED DESCRIPTION

Figure 1:
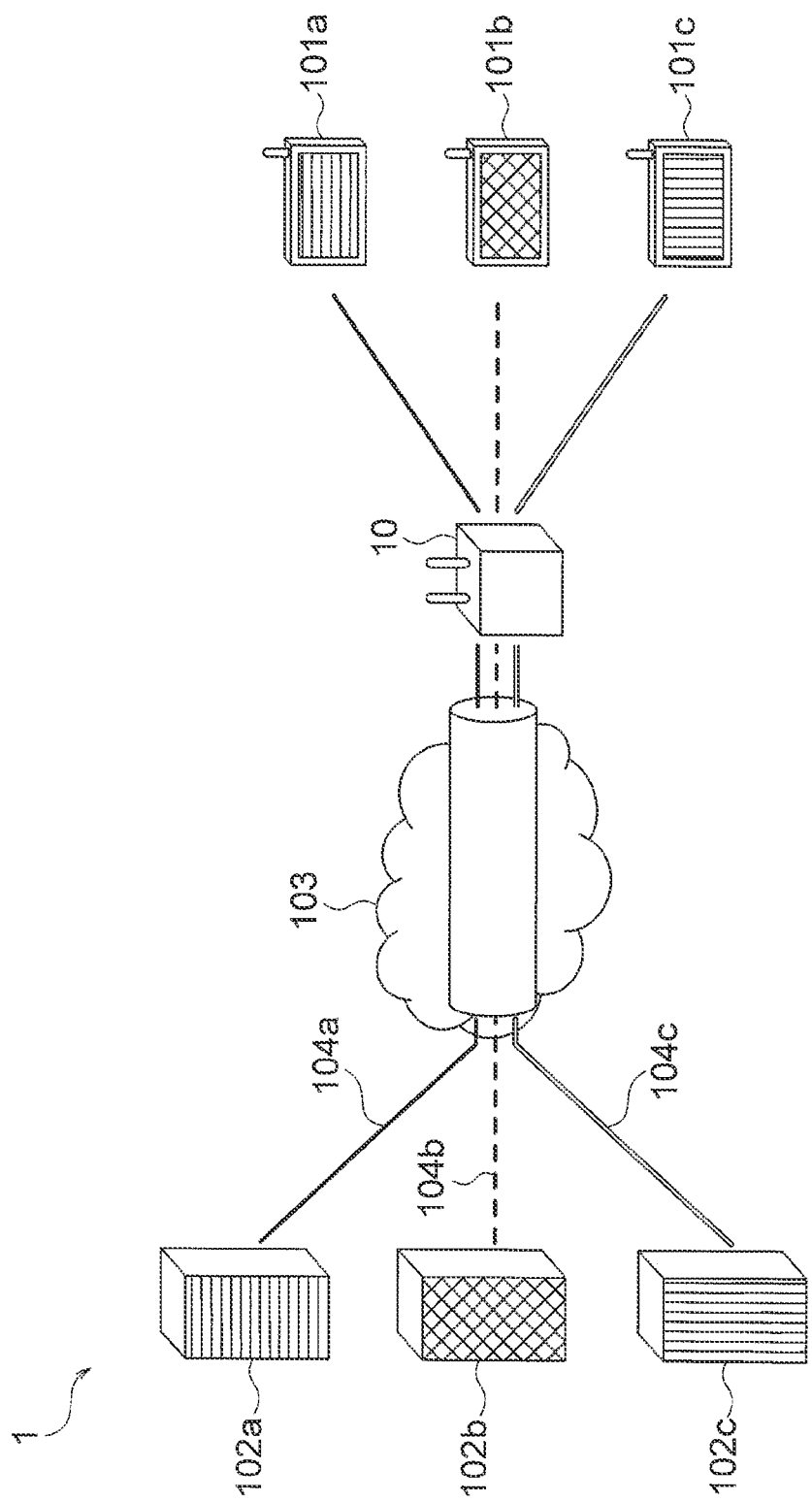
FIG. 1 is a diagram showing a configuration of a communication system 1 in a first embodiment.

According to one embodiment, a relay device that relays communication between an information request device which requests information and an information providing device which provides requested information.

The relay device includes an interface to receive a signal transmitted by the information request device.

The relay device includes a first circuitry to perform, using the signal, at least one of connection management of a network, authentication of the information request device, and authentication of a user of the information request device.

The relay device includes a second circuitry to control allocation of storage areas included in a storage device, or an available range within which information saved in the storage area is able to be provided, when the first circuitry detects establishment of a connection to the network, disconnection of the connection, an authentication result, or a lapse of a valid connection time period.

Below, embodiments will be described with reference to the drawings. The embodiments to be described below are merely examples and not necessarily the same. In addition, the same components in the drawings will be denoted by the same reference numerals, and will not be described as appropriate.

First Embodiment

First, a first embodiment will be described. FIG. 1 is a diagram showing a configuration of a communication system 1 in the first embodiment. As shown in FIG. 1, the communication system 1 includes wireless terminals (information request devices) 101a, 101b, and 101c, an access point (relay device) 10, and servers (information providing devices) 102a, 102b, and 102c. Here, the wireless terminals 101a to 101c, for example, request information. The servers 102a to 102c provide the information requested by the information request devices. The access point (relay device) 10 relays communication between these wireless terminals 101a to 101c and the servers 102a to 102c.

The access point (relay device) 10 is connected to the wireless terminal 101a and the server 102a over a network 104a, connected to the wireless terminal 101b and the server 102b over a network 104b, and connected to the wireless terminal 101c and the server 102c over a network 104c. In the present embodiment, as an example, the networks 104a to 104c are wireless networks. In such a manner, each couple of the wireless terminals and the server belong to different networks 104a to 104c, and communication between the networks is not directly performed.

The network 103 is assumed to be able to transmit the networks 104a to 104c in a multiplexed state, the access point 10 separates the individual networks 104a to 104c from the multiplexed network 103 and provides different wireless networks to the wireless terminals 101a to 101c.

Note that, in the present embodiment, the description will be made assuming that the networks 104a to 104c are transmitted in a multiplexed state on the network 103, and for this scheme, methods such as VLAN (Virtual Local Area Network) specified in IEEE 802.1Q can be used. In addition, the access point 10 provides the plurality of wireless networks by advertising a plurality of SSIDs in such a manner that they correspond to the separate networks 104a to 104c one to one. In such a manner, the access point 10 in the present embodiment forms a plurality of networks.

Note that instead of multiplexing by the network 103, the access point 10 may directly establish a physical connection to each network.

Figure 2:
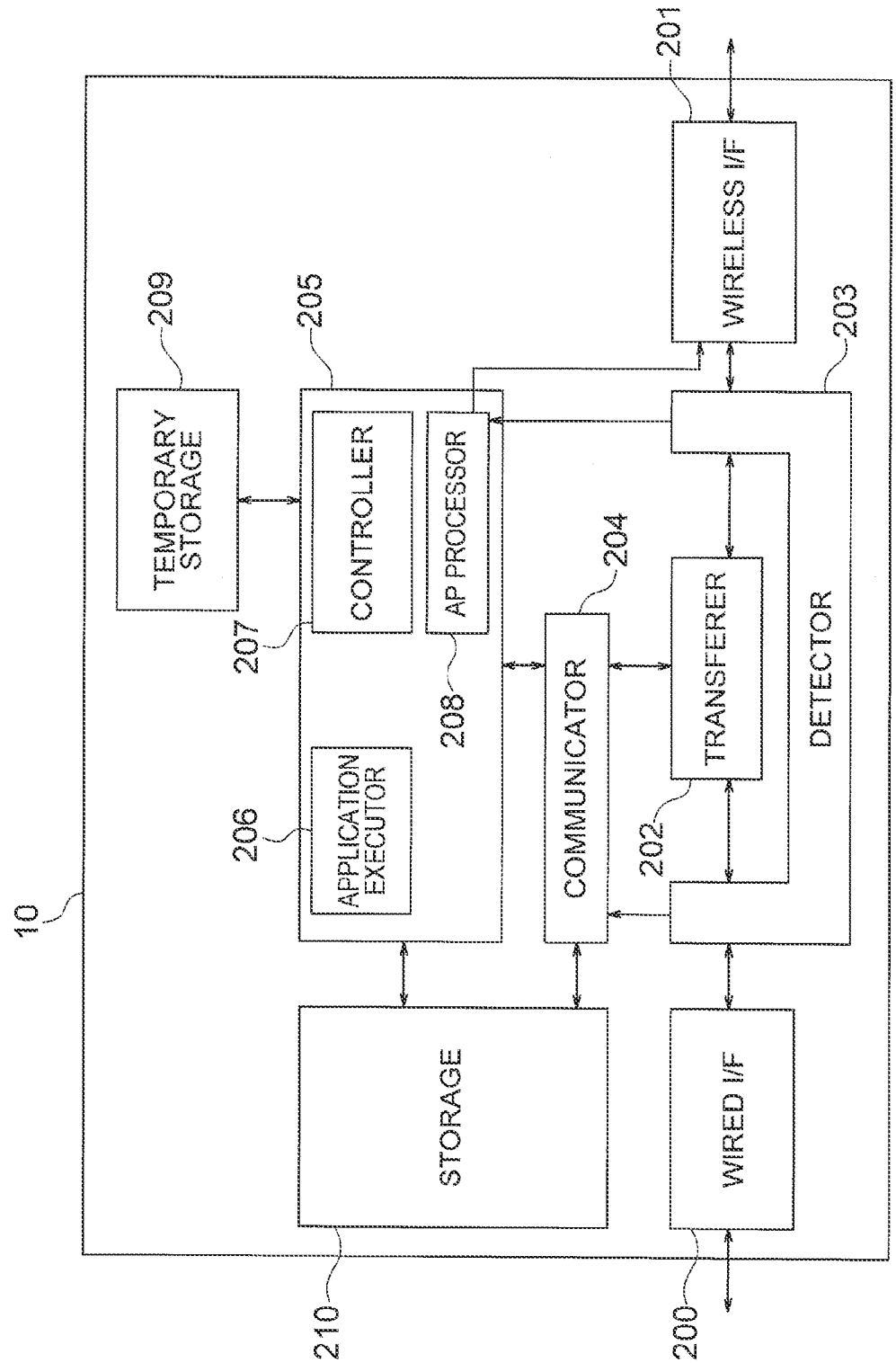
FIG. 2 is a functional block diagram of an access point 10 in the first embodiment.

Next, the functional block diagram of the access point 10 in the first embodiment will be described with reference to FIG. 2. FIG. 2 is the functional block diagram of the access point 10 in the first embodiment. As shown in FIG. 2, the access point 10 includes a wired I/F 200, a wireless I/F (interface) 201, a transferer 202, a detector 203, a communicator 204, a processor 205, a temporary storage 209, and a storage 210.

The wired I/F 200, the wireless I/F 201, the transferer 202, the detector 203, the communicator 204, and the processor 205 can be implemented by circuitry such as a processor or an integrated circuit. Each circuitry which implements the wired I/F 200, the wireless I/F 201, the transferer 202, the detector 203, the communicator 204, and the processor 205 may be different physical circuitry, or all or a part of them may be same physical circuitry.

The wired I/F 200 is an interface used to connect to the network 103 by wire.

The wireless I/F 201 is an interface used to provide a wireless network. The wireless I/F 201 receives signals transmitted by the wireless terminals 101a to 101c, which are an example of the information request devices.

The wired I/F 200 and the wireless I/F 201 may perform only processing of the physical layer or may perform processing up to the data link layer. In the present embodiment, as an example, the following description will be made assuming that the wired I/F 200 and the wireless I/F 201 perform the processing up to the data link layer.

Note that, if the wired I/F 200 and the wireless I/F 201 perform only the processing of the physical layer, the transferer 202 or the communicator 204, which will be described hereafter, may perform the processing of the data link layer. The wired I/F 200 and the wireless I/F 201 are connected to each other via the transferer 202.

The transferer 202 transfers data, which is rather frames in the present embodiment because the processing is in the data link layer as an example, received from the wired I/F 200 or the wireless I/F 201 to an appropriate interface. Here, the appropriate interface is one of the wired I/F 200 and the wireless I/F 201. This processing is performed based on a destination address (destination MAC address) in the data link layer. Note that, the transferer 202 may determine the interface to transfer the data to based on the combination of a transmitting source address and the destination address. The detector 203 is provided between the wired I/F 200 and the transferer 202, and the detector 203 is provided between the wireless I/F 201 and the transferer 202.

The detector 203 checks data (e.g., an Ethernet frame) received at the wired I/F 200 or the wireless I/F 201, checks whether the data is a frame that matches a preset condition, and outputs this data to the communicator 204 if the data matches the condition. Here, the condition is, for example, whether the data is a packet having an identifier used by the communicator 204 as a destination address (e.g., IP address), or whether the data is of communication that exchanges information that may be saved in the temporary storage 209 (e.g., whether a destination TCP (Transmission Control Protocol) port number is 80).

The communicator 204 performs processing under the TCP/IP (Internet Protocol) as needed. That is, the communicator 204 performs establishment processing on a TCP connection for a packet detected by the detector 203, to enable communication with a specified application. Note that this is also applied to packets belonging to the same TCP connection. Furthermore, when the communication is finished, the communicator 204 performs finish processing on the TCP connection to disconnect the TCP connection. Although the processing described here is performed under the TCP as an example, the processing is performed also under the IP (Internet Protocol) or the UDP (User Datagram Protocol) as needed. Among the pieces of information that are subjected to the processing under the TCP/IP by the communicator 204, pieces of information determined to be processed by the access point 10 is transferred to the processor 205.

The processor 205 includes an application executor 206, a controller 207, and an AP processor (management unit) 208. In the present embodiment, these components will be described as individual components but may be software executed by the processor 205.

The application executor 206 is, for example, an OS (Operating System) that manages the operation of the access point 10 and executes an application running on the access point 10.

The temporary storage 209 temporarily stores information exchanged via the access point 10. As a storage device used to implement this caching function, a volatile memory such as an SRAM (Static Random Access Memory) and a DRAM (Dynamic Random Access Memory), a nonvolatile memory such as a NAND flash and an MRAM (Magnetoresistive Random Access Memory), or an auxiliary storage device such as an SSD (Solid State Drive) and a hard disk can be used. The temporary storage 209 may be formed by only one of these means or may be formed by the combination of them. For example, by combining a NAND flash and a DRAM/MRAM, the temporary storage 209 with nonvolatility while the access speed is kept can be formed. Here, the following description will be made assuming that the temporary storage 209 is formed by one component.

Here, the following description will be made assuming that the temporary storage 209 is formed by one component.

In addition, in the present embodiment, as an example, storage areas different from one another are allocated to the temporary storage 209 for the respective networks.

The AP processor 208 implements a function of providing wireless communication (e.g., management of a connected wireless terminal, transmission management of a beacon, user authentication). For example, the AP processor 208 performs at least one of connection management of a network, authentication of a wireless terminal, and authentication of a user of a wireless terminal, using a signal received by the wireless I/F 201. Specifically, the AP processor 208 detects a connection request, a disconnection request, or an authentication success of a wireless terminal (information request device) or a user of a wireless terminal (information request device), from the signal received by the wireless I/F 201.

The controller 207 controls the temporary storage 209. Specifically, when the AP processor 208 detects a connection to a network, disconnection of the connection, an authentication result by the AP processor 211 or a lapse of valid connection time period, the controller 207 changes the allocation of storage areas that the temporary storage 209 has, or available ranges within which information saved in the storage areas can be provided. More specifically, the controller 207 changes this allocation of storage areas or this available object range when the AP processor 208 detects a connection request, a disconnection request, or an authentication success.

The storage 209 stores information used by the communicator 204 and the processor 205. The storage 209 is, for example, a RAM. If there is information (e.g., program or data) that need to be permanently saved, the storage 209 may be formed by a RAM and an auxiliary storage device (e.g., hard disk or SSD).

(Basic Operation of Download Processing as Transparent Proxy)

There will be described the basic operation of download processing by the access point 10, as a transparent proxy, having the above configuration. Although FIG. 1 shows three networks 104*a* to 104*c*, the description will be made here focusing on the communication between the terminal 101*a* and the server 102*a*, which belong to the network 104*a*.

When the terminal 101*a* detects that the access point 10 provides the network 104*a*, which is a wireless network corresponding to SSID-a, the terminal 101*a* tries establishing a connection to this network 104*a* via the wireless I/F 201 of the access point 10. This is performed in accordance with a connecting procedure, for example, specified by IEEE 802.11, and control frames such as a Probe Request and a Probe Response, or an Association Request and an Association Response are exchanged between the terminal 101*a* and the access point 10.

The wireless I/F 201 of the access point 10 receives these frames transmitted by the terminal 101*a*. Then, the detector 203 of the access point 10 detects them as frames that should be processed in the AP processor 208. Then, the AP processor 208 of the access point 10 performs processing, authentication processing, or the like in accordance with the specifications of IEEE 802.11, and transmits a control frame to be a response to the wireless terminal 101*a* via the wireless I/F 201. Although the description has been made here about the network 104*a*, the same is true for the other networks or the other wireless terminals.

Figure 3:
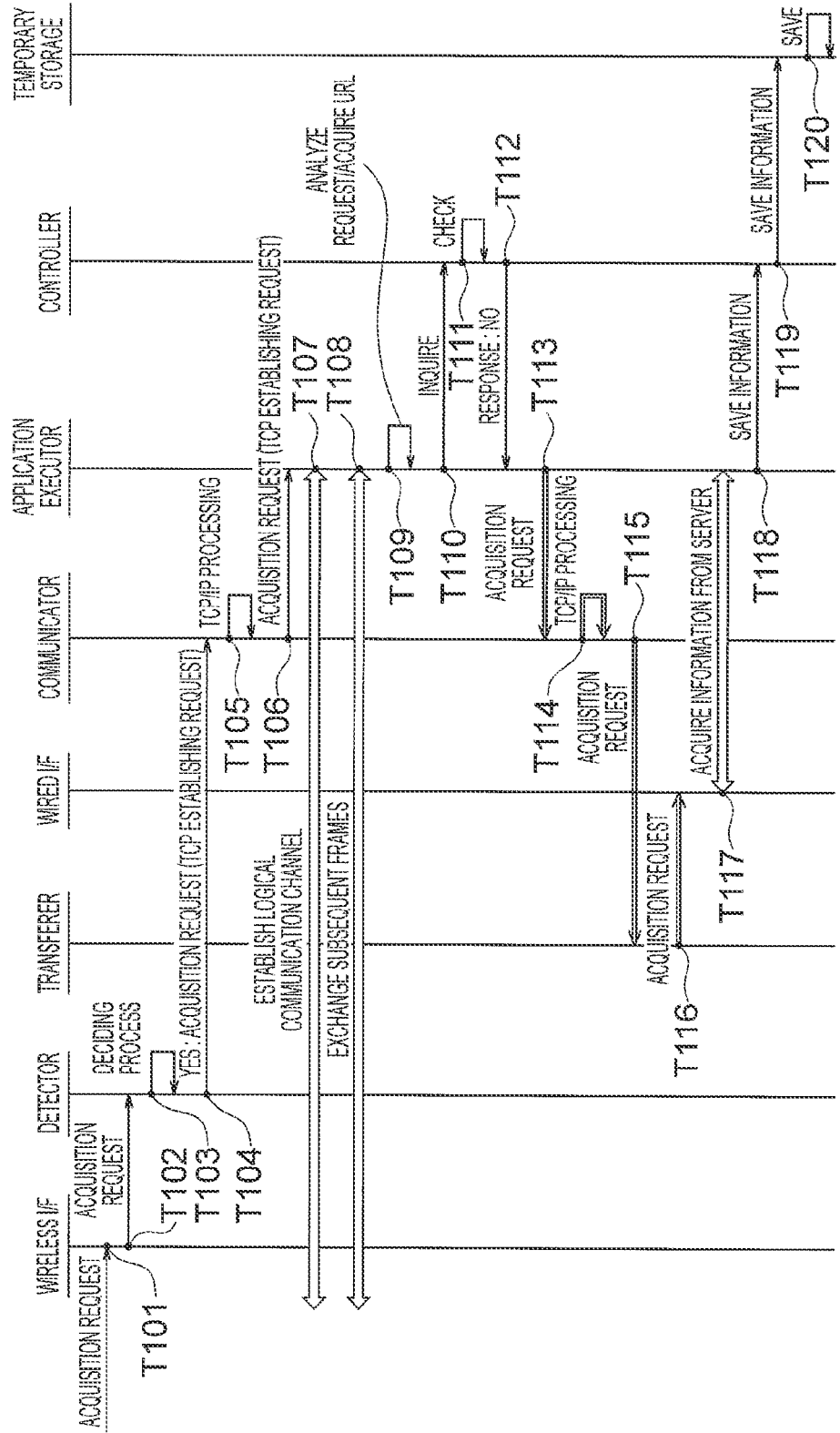
FIG. 3 is a sequence diagram showing an example of the flow of processing by the access point 10 in the case where information for which a wireless terminal 101a makes a downloading request is not saved in a temporary storage 209.

The following description will be made assuming that a wireless connection is established between the access point 100 and the terminal 101*a*. There will be described, with reference to FIG. 3, the operation of the access point 10 in the case where information for which the wireless terminal 101*a* makes a downloading request is not saved in the temporary storage 209. FIG. 3 is a sequence diagram showing an example of the flow of processing by the access point 10 in the case where information for which the wireless terminal 101*a* makes a downloading request is not saved in the temporary storage 209. First, the processing is started by the wireless terminal 101*a* requesting the server 102*a* to acquire object information to be acquired.

(T101) The wireless I/F 201 receives an acquisition request for this object information.

(T102) Then, the wireless I/F 201 passes the received acquisition request to the detector 203.

(T103) The detector 203 determines whether this acquisition request is an object to be processed by the communicator 204. This acquisition request is decided to be an object to be processed because a rule is set under which an acquisition request for object information (e.g., in HTTP, the destination port thereof is the TCP port number 80) is an object to be processed by the communicator 204.

(T104) As a result, the received frame is passed to the communicator 204. If this acquisition request is determined by the detector 203 not to be processed by the communicator 204, this acquisition request is passed to the transferer 202 and thereafter transferred to a high-level network via the wired I/F 200. Here, according to FIG. 2, this acquisition request is passed again through the detector 203, and on the second time, this acquisition request passes through the detector 203 without the determination.

Note that this processing is not limited only to a single frame, but may be performed on subsequent frames without the decision under the condition if the headers of the frames contain the same pieces of information. That is, if pieces of information contained in the headers of a subsequent frame, an Ethernet header, an IP header, and a TCP header, have the same values as those of the respective headers of a frame that has been once determined by the detector 203, the detector 203 may skip checking the condition and process the subsequent frame as with the past frame.

(T105) The communicator 204 performs processing under the TCP/IP on the passed frame.

(T106) Then, the communicator 204 passes the acquisition request to the application executor 206.

(T107) Here, in the application executor 206, an application that acquires information from the server 102*a* on behalf of the wireless terminal 101*a* is running. The first frame contains an IP packet to establish a TCP connection, and thus a logical communication channel (TCP connection) is established between the wireless terminal 101*a* and the application executor 206 together with subsequent frames.

(T108) Thereafter, the subsequent frames are exchanged.

(T109) Next, the application executor 206 analyzes the request received from the wireless terminal 101*a* to acquire an identifier to identify information to be acquired. This identifier is expressed, for example, in the form of a URL.

(T110) Next, the application executor 206 notifies the controller 207 of this URL to inquire whether the information in question is cached in the temporary storage 209.

(T111) Next, the controller 207 receiving the inquiry decides whether the information in question is cached in the temporary storage 209 in accordance with information managed by itself.

(T112) The controller 207 transmits a decision result to the application executor 206 as a response. FIG. 3 shows, as an example, the case where it is decided that the information in question is not cached.

(T113) If the response indicates that the information in question is not cached, the application executor 206 acquires the information in question from the server 102a on behalf of the wireless terminal 101a. More specifically, the application executor 206 first generates an acquisition request for the information in question and passes the acquisition request to the communicator 204.

(T114 to T116) The communicator 204 formats this acquisition request into a TCP/IP packet, and the formatted acquisition request is transferred to the wired I/F 200 via the transferer 202.

(T117 and T118) Next, the wired I/F 200 acquires object information being the object of the acquisition request from the server 102a through HTTP communication or the like, and this object information is transferred to the controller 207 via the application executor 206.

(T119 and T120) When the controller 207 receives the information from the application executor 206, the controller 207 stores this information in the temporary storage 209. The information that the wireless terminal 101a has requested to be acquired is thereby cached in the temporary storage 209.

Note that the information cached is associated with an term of validity, information to identify the wireless terminal 101a that has requested the information, and information on the wireless network to which the wireless terminal 101a is connected, and is in a state where the controller 207 can properly manage the information. Here, the information on the wireless network to which the wireless terminal 101a is connected to is available from the AP processor 208 or identified from the IP address used by the wireless terminal 101a. The acquired information is finally transmitted to the wireless terminal 101a as a response via the communicator 204 and the wireless I/F 201.

Figure 4:
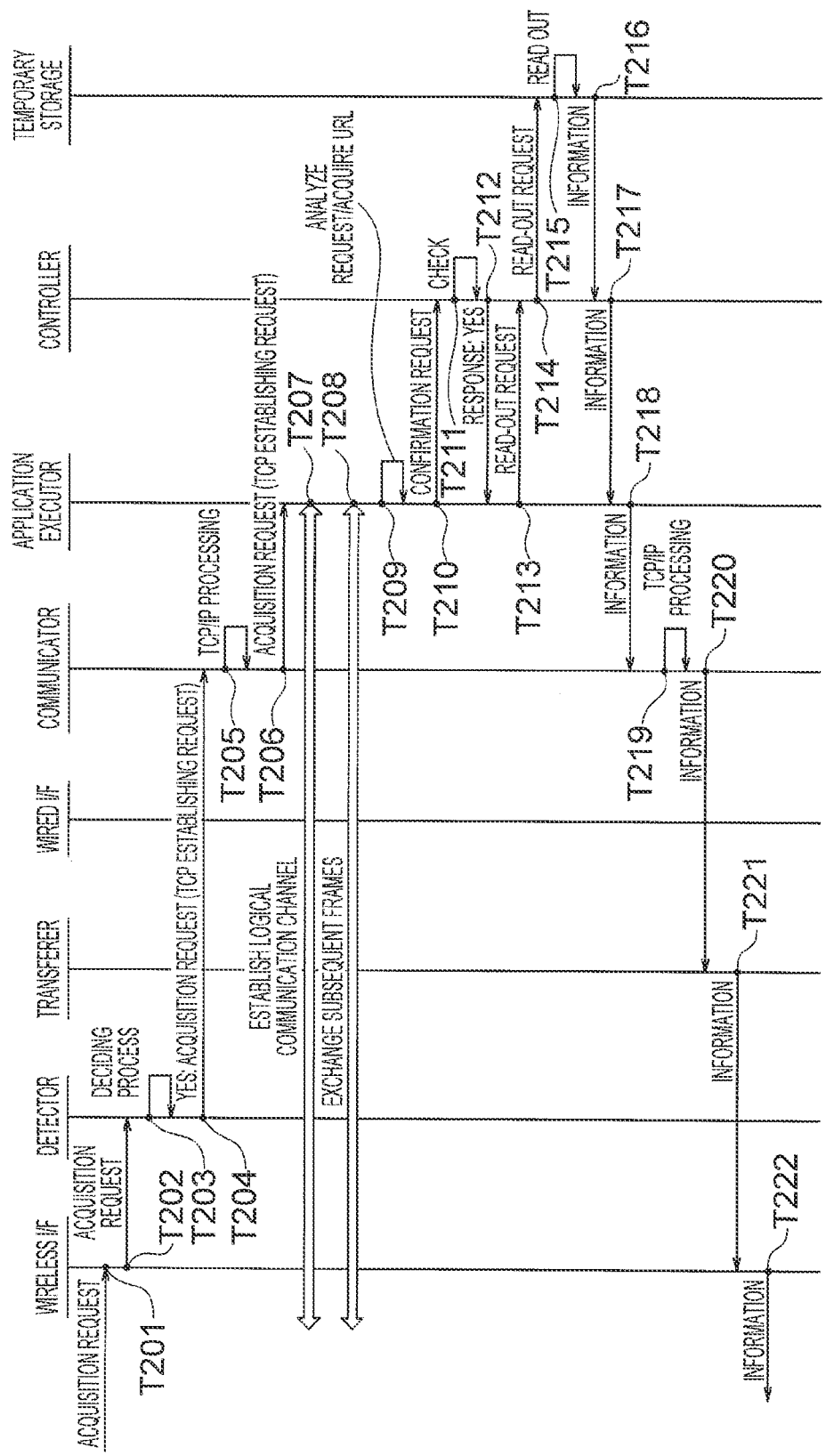
FIG. 4 is a sequence diagram showing an example of the flow of processing by the access point 10 when information for which the wireless terminal 101a makes a downloading request is saved in the temporary storage 209.

Next, there will be described, with reference to FIG. 4, the operation of the access point 10 in the case where information for which the wireless terminal 101a makes a downloading request is saved in the temporary storage 209. FIG. 4 is a sequence diagram showing an example of the flow of processing by the access point 10 when information for which the wireless terminal 101a makes a downloading request is saved in the temporary storage 209. The processing from T201 to T211 is the same as the processing from T101 to T111 and will not be described.

(T212) In FIG. 4, it is assumed that information requested from the wireless terminal 101a is cached in the temporary storage 209, and thus the controller 207 passes to the application executor 206 a response indicating that the information is cached.

(T213) The application executor 206 receiving the response indicating that the information is cached passes to the controller 207 a request to read out the information.

(T214) Then, the controller 207 reads out the information in question from the temporary storage 209 through the following procedure. The controller 207, for example, issues to the temporary storage 209 a request to read out the information in question.

(T215) The temporary storage 209 receiving the read-out request reads out the information in question.

(T216) Then, the temporary storage 209 transmits the read-out information to the controller 207.

(T217 and T218) The controller 207 transmits the information in question to the wireless terminal 101a via the communicator 204 and the wireless I/F 201, through the following procedure. The information in question is transferred from the controller 207 to the application executor 206 and transferred from the application executor 206 to the communicator 204.

(T219 to T221) The communicator 204 formats the information in question into a TCP/IP packet, and the formatted information obtained through the formatting is transferred to the wireless I/F 201 via the transferer 202.

(T222) The wireless I/F 201 wirelessly transmits this formatted information to the wireless terminal 101a as a response.

In such a manner, the access point 10 can provide a caching function, and thus transmission delays over the network can be reduced. In addition, the wireless terminals 101a to 101c are not affected by delays or congestions or the like in a wide area network, and thus energy consumption of the wireless terminals 101a to 101c resulting from them can be reduced.

(Resource Adjusting Function of Temporary Storing)

Next, there will be described the adjusting function of the temporary storage 209 that is implemented by the present embodiment. Here, the following description will be made assuming that the wireless terminal 101a and the access point 10 are before establishing a connection therebetween. Note that the networks 104b and 104c have already been connected to the other wireless terminals.

Figure 5:
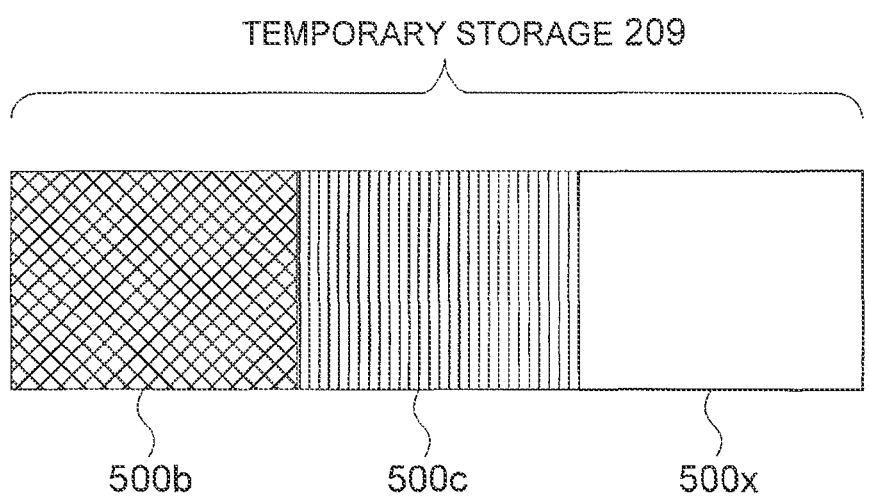
FIG. 5 is a diagram showing a state of the temporary storage 209 of the access point 10 before the wireless terminal 101a establishes a connection.

FIG. 5 is a diagram showing the state of the temporary storage 209 of the access point 10 before the wireless terminal 101a establishes a connection. As shown in FIG. 5, storage areas 500b and 500c for pieces of information that are requested over the networks 104b and 104c, respectively, and a storage area 500x that is commonly accessible for wireless terminals connected to the respective networks are allocated to the temporary storage 209 before the wireless terminal 101a establishes a connection. Here, in this storage area 500x, for example, information that the provider of the access point 10 intends to broadly provide to users of the networks is stored. The information that is intended to be broadly provided to the users of the networks is, for example, advertising data for which access control per user or network is unnecessary, or information that is locally applicable, and the like.

Assume that the wireless terminal 101a tries a connection to the network 104a in the state where the storage areas are allocated in the temporary storage 209 as shown in FIG. 5. As described above, control frames are exchanged between the wireless terminal 101a and the access point 10. When the processing such as authentication is completed without problems, the terminal 101a establishes a wireless connection to the access point 10. At that point, since there is no storage area allocated to the network 104a as shown in FIG. 5, there is no area available to the wireless terminal 101a connected to the network 104a. In the present embodiment, even in such a situation, the controller 207 properly changes the allocation of the storage areas as shown in FIG. 6 to allocate a storage area available to the wireless terminal 101a.

Figure 6:
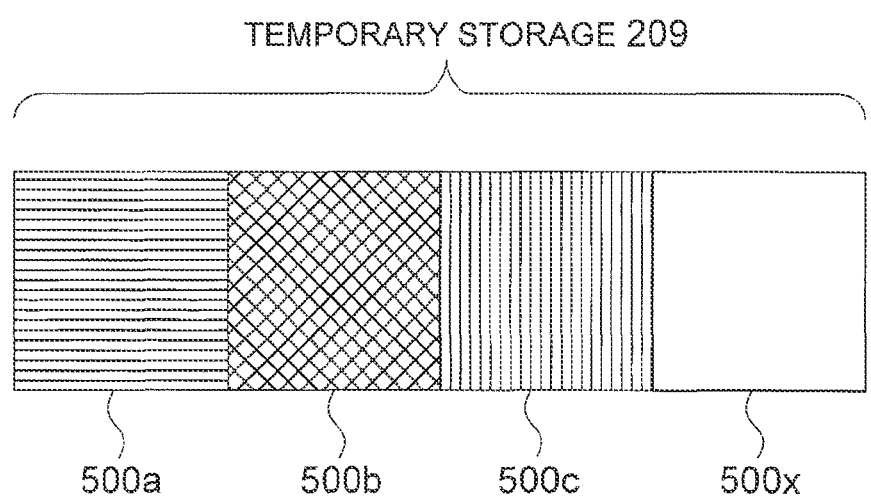
FIG. 6 is a diagram showing a state after the change of the allocation of storage areas in the temporary storage 209.
Figure 7:
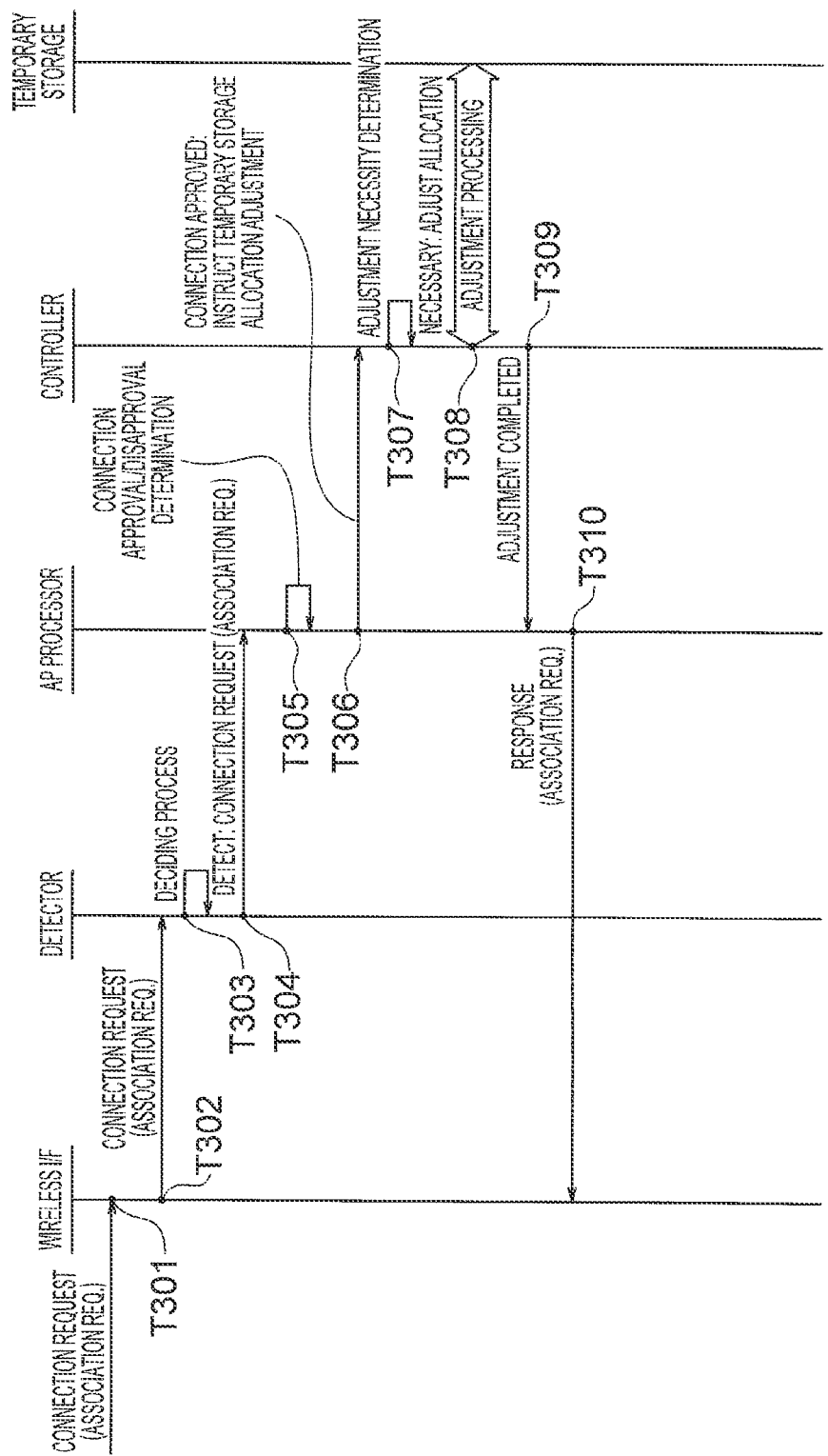
FIG. 7 is a sequence diagram of changing the allocation of the storage areas in the case where a wireless connection is approved.

FIG. 6 is a diagram showing a state after the change of the allocation of the storage areas in the temporary storage 209. FIG. 7 is a sequence diagram of changing the allocation of the storage areas in the case where a wireless connection is approved.

(T301 and T302) Upon receiving a connection request (Association Request) from the wireless terminal 101a, the wireless I/F 201 transmits the connection request to the detector 203.

(T303 and T304) The detector 203 determines that this connection request to be an object that should be processed by the communicator 204. Then, this connection request is transferred to the AP processor 208 via the communicator 204.

(T305) Next, the AP processor 208 closely inspects this connection request to determine connection approval/disapproval. It is assumed here that connection approval is determined.

(T306) Since the AP processor 208 determines connection approval, the AP processor 208 instructs the controller 207 to adjust the allocation of the temporary storage 209.

(T307) The controller 207 determines whether there is a need to adjust the storage area of the temporary storage 209 for the network 104a to which the wireless terminal 101a is to be connected. Specifically, for example, the AP processor 208 determines whether there is any area allocated for a wireless network to which a connection is to be established. In the state in FIG. 5, it is determined that the storage area needs to be adjusted since there is no space for the storage area. This determination processing may make the determination by actually scanning the temporary storage 209, or may make the determination by referring information used to manage the state of the temporary storage 209, the information being saved in advance in the storage 210 or the like.

In such a manner, the controller 207 decides whether to change the allocation of storage areas in the temporary storage 209 using the allocation status of the storage areas in the temporary storage 209 being an accessible storage device, and changes the allocation of the storage areas if deciding to change this allocation of the storage areas.

Note that when the number of connecting terminals in the wireless network 104a, to which the wireless terminal 101a to be connected is added, exceeds a threshold value, the controller 207 may expand the storage area allocated to the wireless network 104a.

(T308) The controller 207 changes the allocation of the storage areas in the temporary storage 209, as shown in FIG. 6. In FIG. 6, as compared with FIG. 5, a storage area 500a allocated to the wireless network 104a is newly added, and the storage areas 500a, 500b, 500c, and 500x are equally divided into. In such a manner, the storage areas in the temporary storage 209 are allocated for the respective networks, and the controller 207 changes the allocation of the storage areas for the respective networks.

Note that although the storage areas are equally divided into in FIG. 6, but the allocation is not limited to this, and as will be described hereafter, there are various methods for this adjustment.

(T309) When the readjustment is completed, the controller 207 notifies the AP processor 208 of the completion of the adjustment.

(T310) The AP processor 208 transmits an Association Response indicating the completion of the connection to the wireless terminal 101a via the wireless I/F 201 as a response. The subsequent processing is the same as that in the case of FIG. 3 or FIG. 4.

Note that if it is decided, at the first Association Request, that connection is disapproved, the allocation of the storage areas in the temporary storage 209 is not changed. Also if the controller 207 determines that the adjustment is unnecessary, the allocation of the storage areas in the temporary storage 209 is not changed. This is because a cache is not needed in the former case due to no connection and a cache is already allocated in the latter case.

In addition, a series of descriptions have been made about the example in which the access point 10 causes the controller 207 to change the allocation of the storage areas in the temporary storage 209 in response to Association Request/Response. Additionally, when the authentication of the wireless terminal 101a or a user of the wireless terminal 101a is completed, the controller 207 may change the allocation of storage areas in the temporary storage 209.

The present embodiment has a feature that the allocation of storage areas in the temporary storage 209 is changed when a wireless terminal belonging to a network for which no storage area has been allocated thus far in the temporary storage 209 wants to connect. Since this change of the allocation of storage areas is triggered by a connection to a wireless terminal through wireless communication, or by the completion of the authentication of the wireless terminal 101a or a user thereof, information on a network to which the wireless terminal belongs can be used.

In addition, when the wireless I/F 201 receives an acquisition request of information from one of the wireless terminals 101a to 101c, the controller 207 searches for only a storage area allocated to a network to which the wireless terminal in question is connected. For example, when the wireless I/F 201 receives an acquisition request for information from the wireless terminal 101b, the controller 207 searches for only a storage area allocated to the network 104b to which the wireless terminal 101b in question is connected. Thereby, even if information requested by the terminal 101b connected to the network 104b is saved in the area 500c, this information is not provided from the temporary storage 209. Performing in such a manner allows to the use efficiency of a cache to be improved by the controller 207 changing the allocation of the storage areas even in an environment under access control over information on the assumption that the network is closed.

(Resource Adjusting Algorithm of Temporary Storage 209)

Next, the resource adjusting algorithm of the temporary storage 209 will be described. The changed allocation of the storage areas shown in FIG. 6 is the equal division of the whole storage area by the number of networks. However, it is conceivable that the capacity of the temporary storage suitable for a cache differs between a network having a small number of connected terminals and a network having a large number of connected terminals. Taking this point into consideration, the controller 207 may change the allocation of the storage areas in accordance with the number of connecting terminals in each network. For example, the controller 207 may change the allocation of the storage areas in such a manner as to allocate a larger storage area for a network having a larger number of connecting terminals.

Specifically, for example, when the ratio among the number of terminals connected to the network 104a, the number of terminals connected to the network 104b, and the number of terminals connected to the network 104c is 1:22:37, the controller 207 may divide the whole storage area in the temporary storage 209 into equal 60 areas and may allocate 1/60 of the whole storage area to the network 104a, 22/60 of the whole storage area to the network 104b, and 37/60 of the whole storage area to the network 104c, in accordance with the numbers of connecting terminals.

Here, when the number of connections in network as a whole is small like the first network, it is difficult to make an efficient allocation. Then, a rule may be provided under which, for example, the numbers of connecting terminals are rounded up to the nearest ten. In the former example, when the number of connecting terminals are rounded up to the nearest ten, the resulting ratio among the numbers of connecting terminals of 10:30:40, and then the controller 207 may allocate ⅛ of the whole storage area to the network 104$a$, ⅜ of the whole storage area to the network 104$b$, and ⅘ of the whole storage area to the network 104$c$.

In addition, the controller 207 may change the allocation of the storage areas in accordance with a rate at which information requested by a wireless terminal (information request device) can be transmitted as a response using information on the temporary storage 209 (hereafter, also referred to as a hit rate of a cache).

For example, when the hit rate of a cache in a storage area allocated to a given network falls below a target hit rate that is set for the network in question, and a wireless terminal is newly connected to the network in question, the storage area may be expanded. It is thereby possible to increase the number of pieces of information to be cached, and improve the hit rate of the cache. Here, the target hit rate may be determined for each wireless network.

(Discarding Information when Allocation of Storage Areas in Temporary Storage is Changed)

Next, there will be described discarding information when the allocation of storage areas in the temporary storage is changed.

As described about the case the allocation of storage areas is changed as from that shown in FIG. 5 to that shown in FIG. 6, in the present embodiment, the case may occur in which a part of a storage area that has already been allocated to a given network is forcibly allocated to the other network. At this point, pieces of information held in the storage area in question has to be discarded with the reduction of the storage area.

Thus, when a part or the whole of a storage area allocated to one network is to be allocated to the other network, the controller 207 discards pieces of information included in the part or the whole of the storage area under a predetermined rule. This rule is a rule that defines a method of selecting a piece of information to be discarded, and for example, there is a rule under which a piece of information having the oldest reference time point is first discarded (Least Recently Used), or a rule under which a piece of information having the least number of references is first discarded (Least Frequently Used). Note that the controller 207 may perform the discard under the other algorithms.

In addition, the controller 207 may preferentially discard a piece of information, among pieces of information included in a storage area to be reduced, having the shortest time period from the current time point up to a time point at which the cache of the piece of information is expired.

For example, when a valid time period of a piece of information from the current time point is provided, the controller 207 may first discard a piece of information having the shortest valid time period. When an term of validity time of a piece of information is provided, the controller 207 may first discard a piece of information having the earliest term of validity time. Here, an term of validity time of a piece of information is, for example, an term of validity time that is specified by a response message corresponding to an acquisition request in the case of HTTP. Alternatively, the cache controller 207 may independently set an term of validity time. In any case, the controller 207 may properly discard a cached piece of information using some algorithm and thereafter reduce the allocated size.

(Changing Allocation of Storage Areas Using User Identifying Information)

The allocating method to the temporary storage 209 described thus far is performed on a network basis. However, since the user identifying information to identify a user is used in the authentication processing performed for the connection to the access point 10, the controller 207 may change the allocation of storage areas using this user identifying information.

In addition, the control may be performed on an individual user basis, or on a group basis, the group being a collection of a plurality of users. This group may correspond to an existing group such as a general affairs department and a sales department, or may be a group that is formed on the basis of personal information on a user (e.g., address or age) or the preference of a user. Alternatively, this group may be a group that is formed by posing the other condition, such as a group of users who buy an access right for a content (in this case, access is permitted to only users having the access right). In addition, the control may be performed on a wireless terminal basis.

Figure 8:
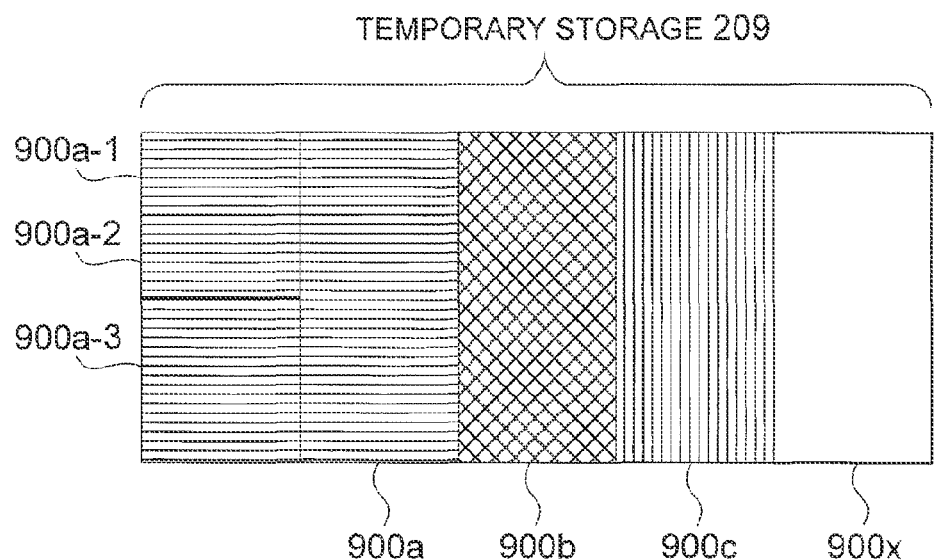
FIG. 8 is a diagram showing a first example of the allocation of storage areas using user identifying information.

Note that, access control to these groups may coexist with access control using a network. For this reason, as shown in FIG. 8, for example, the allocation of storage areas for each user may be equally treated with the allocation of storage areas for each network. FIG. 8 is a diagram showing a first example of the allocation of storage areas using user identifying information. In FIG. 8, a storage area 900$a$-1 is allocated to a first user, a storage area 900$a$-2 is allocated to a second user, and a storage area 900$a$-3 is allocated to a third user. The storage area 900$a$ is allocated to the network 104$a$, a storage area 900$b$ is allocated to the network 104$b$, and the storage area 900$c$ is allocated to the network 104$c$. In addition, the storage area 500$x$ is a storage area that is commonly accessible for wireless terminals connected to the respective network. In this example of FIG. 8, treating the whole user identifying information equally with the networks, the whole storage area is divided into five equal areas, one of which is divided into three equal areas, but the division is not limited thereto. Treating individual users equally with networks, the whole storage area may be divided into seven equal areas, and the divided storage areas may be allocated to the individual users.

Figure 9:
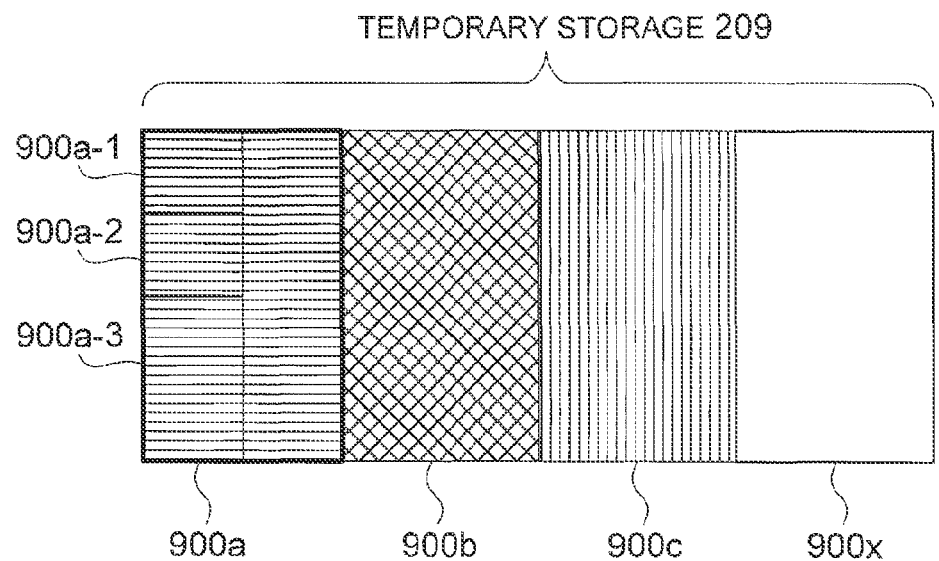
FIG. 9 is a diagram showing a second example of the allocation of storage areas using user identifying information.

Alternatively, as shown in FIG. 9, an area into which an area allocated for each network is further subdivided may be allocated for each user. FIG. 9 is a diagram showing a second example of the allocation of storage areas using user identifying information. As shown in FIG. 9, the whole storage area in the temporary storage 209 is divided into four equal areas, the storage areas 900$a$ to 900$c$ allocated to the networks 104$a$ to 104$c$, respectively, and a storage area 900$x$ common to the networks. Furthermore, the storage area 900$a$ includes the storage area 900$a$-1 to be allocated to the first user, the storage area 900$a$-2 to be allocated to the second user, and the storage area 900$a$-3 to be allocated to the third user.

In such a manner, the storage area in the temporary storage 209 may be allocated for each wireless terminal (information request device), for each user of a wireless terminal (information request device), or for each group of users. Then, the controller 207 may change the allocation of storage area for each wireless terminal (information request device), for each user of a wireless terminal (information request device), or for each group of users.

(Readjustment of Allocated Storage Area with Termination of Connection)

Next, there will be described the readjustment of an allocated storage area with the termination of a connection to the access point 10. A wireless terminal connected to the access point 10 terminates the connection to the access point for some reason. As the termination of a connection, there is explicit termination (e.g., termination in which a Disassociation frame and a Deauthentication frame are exchanged), and implicit termination (e.g., termination in which a lapse of a predetermined valid connection time period is detected using a timer). In both cases, the access point 10 may change the allocation of allocated storage areas.

For example, contrary to the above described case where a wireless terminal is first connected to a specified network, when the number of terminals connected to a specified network becomes zero, the controller 207 may readjust storage areas in the temporary storage 209 to release a storage area allocated to this specified network. Specifically, for example, when detecting that the number of terminals connected to the network 104*a* becomes zero, the controller 207 may change the allocation of storage areas in the temporary storage 209 from the state of FIG. 6 to the state of FIG. 5.

Note that, in the case of dividing the temporary storage 209 in accordance with the number of connecting terminals, the readjustment may be performed with changes in the number of connecting terminals. In the case of performing the division using a determined threshold value (in the above-described example, the threshold value is determined by rounding up to the nearest ten), the readjustment may be performed with crossing-threshold-value timings. Here, the crossing-threshold-value timings are timings of exceeding the threshold value or timings of falling below the threshold value.

Similarly, in the case of allocating areas in the temporary storage 209 using user identifying information, when the AP processor 208 detects the termination of a connection between a wireless terminal used by an object user and the access point 10, the allocation of storage areas in the temporary storage 209 may be changed. Specifically, for example, when the AP processor 208 detects the termination of the connection between the wireless terminal used by the object user and the access point 10, the controller 207 may release a storage area allocated to the object user and allocate the storage area to the other user or network.

Figure 10:
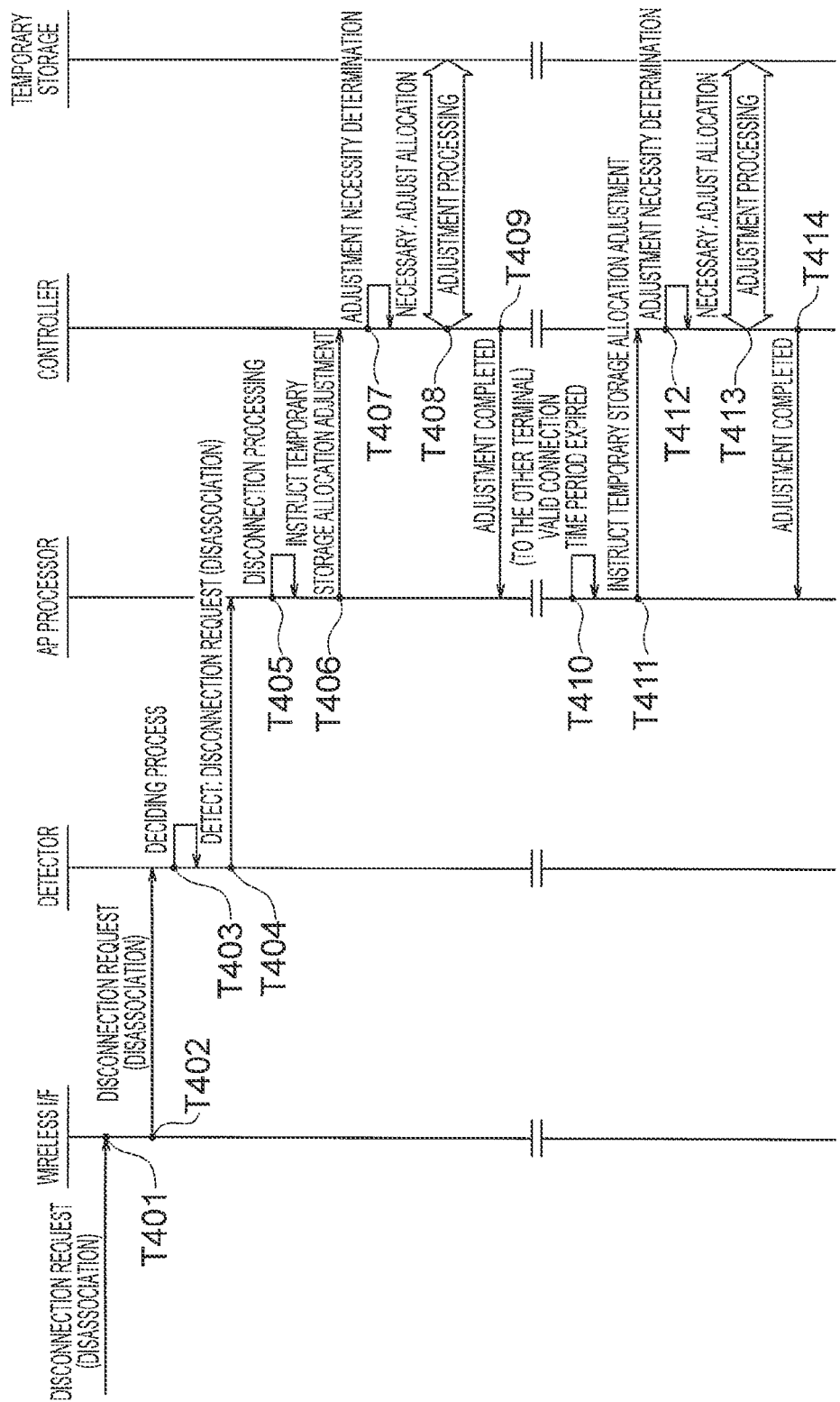
FIG. 10 is a sequence diagram of storage area readjustment processing in the case of detecting the termination of the connection between a wireless terminal and the access point 10.

Next, there will be described storage area readjustment processing when the termination of a connection between a wireless terminal and the access point 10 is detected, with reference to FIG. 10. FIG. 10 is a sequence diagram of the storage area readjustment processing in the case of detecting the termination of the connection between the wireless terminal and the access point 10. Here, it is assumed that the wireless terminal 101*a* and the wireless terminal 101*b* have already been connected to the access point 10.

(T401 and T402) When the wireless I/F 201 receives a disconnection request (Disassociation) from the wireless terminal 101*a*, the wireless I/F 201 transfers this disconnection request to the detector 203.

(T403) The detector 203 determines whether this disconnection request is an object that should be processed by the communicator 204. A rule is set under which a disconnection request is a processing object in the communicator 204, and thus this disconnection request is decided to be an object that should be processed.

(T404) This disconnection request is transferred to the AP processor 208.

(T405 and T406) The AP processor 208 receiving a disconnection request performs prescribed disconnection processing in response thereto and instructs the controller 207 to readjust the allocation of storage areas in the temporary storage 209.

(T407 and T408) The controller 207 receiving this instruction determines the necessity of the adjustment of the storage areas. Here, the controller 207 determines that the adjustment is needed and readjusts the allocation of storage areas in the temporary storage 209.

(T409) When the readjustment is completed, the controller 207 notifies the AP processor 208 that the adjustment is completed.

(T410 and T411) Thereafter, the AP processor 208 determines whether a valid connection time period has elapsed with respect to the other wireless terminal 101*b*. Here, it is determined that the valid connection time period has elapsed, and the AP processor 208 instructs the controller 207 to readjust the allocation of storage areas in the temporary storage 209.

(T412 and T413) The controller 207 receiving this instruction determines the necessity of the adjustment of the storage areas. Here, the controller 207 determines that the adjustment is needed and readjusts the allocation of storage areas in the temporary storage 209.

(T414) When the readjustment is completed, the controller 207 notifies the AP processor 208 that the adjustment is completed.

(Modification of Data Management Method in Temporary Storage 209)

The descriptions thus far have been made about the method in which the temporary storage 209 is divided into a plurality of areas and managed, but this management method is merely an example and may be the other method. For example, the controller 207 may not subdivide a storage area but may associate individual pieces of information with the acquired networks and save them in the temporary storage 209. This allows access control of pieces of information to each network to be implemented.

Similarly, the controller 207 may associate individual pieces of information with user identifying information to identify a user of the wireless terminal connected to a network or group identifying information to identify the group of this user and save them in the temporary storage 209. This allows also access control of pieces of information on a user basis or on a group of users basis to be implemented.

Furthermore, by managing pieces of information saved in the temporary storage 209 as well as the number or the sizes of pieces of information saved on a network or user basis, the controller 207 can control the total amount of the pieces of information saved for each network or user.

Here, the size may be an actual data size, a size and the number of storages (e.g., blocks) used in the temporary storage 209, or the number of used pieces of metadata to maintain and manage pieces of information (the number of used entries in i-node or FAT (File Allocation Table), or the number of hash values in a KVS (Key Value Store)).

(Authenticating User by External Authentication Server)

Next, there will be described the case of authenticating a user by an external authentication server. The descriptions thus far have been made assuming that the connection approval/disapproval determination of a wireless terminal and the authentication of a user are performed by the access point 10. However, the connection approval/disapproval determination of a wireless terminal and/or the authentication of a user may be performed by a device provided outside the access point 10.

There will be described the case where the authentication processing of a user is performed by an authentication server that is installed outside the access point 10, with reference to FIG. 11.

Figure 11:
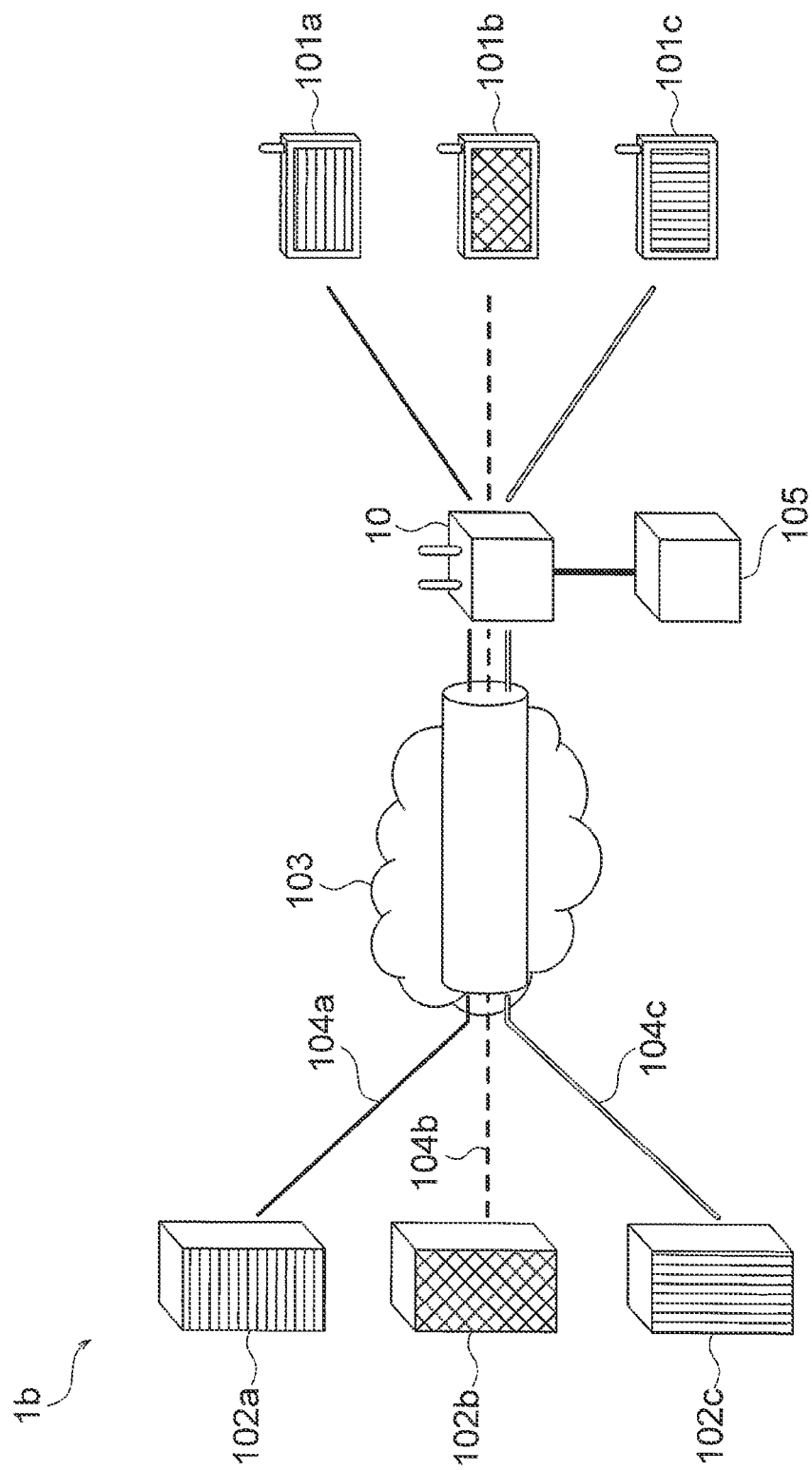
FIG. 11 is a diagram showing a configuration of a communication system 1b in a modification of the first embodiment.

FIG. 11 is a diagram showing the configuration of a communication system 1b in a modification of the first embodiment.

Note that components common to those in FIG. 1 are denoted the same reference characters, and will not be described specifically. As shown in FIG. 11, the configuration of the communication system 1b in the modification of the first embodiment is a configuration, as compared with the configuration of the communication system 1 in the first embodiment, in which an authentication server (authentication device) 105 connected to the access point 10 is added. The authentication server 105 performs the authentication of a user.

Figure 12:
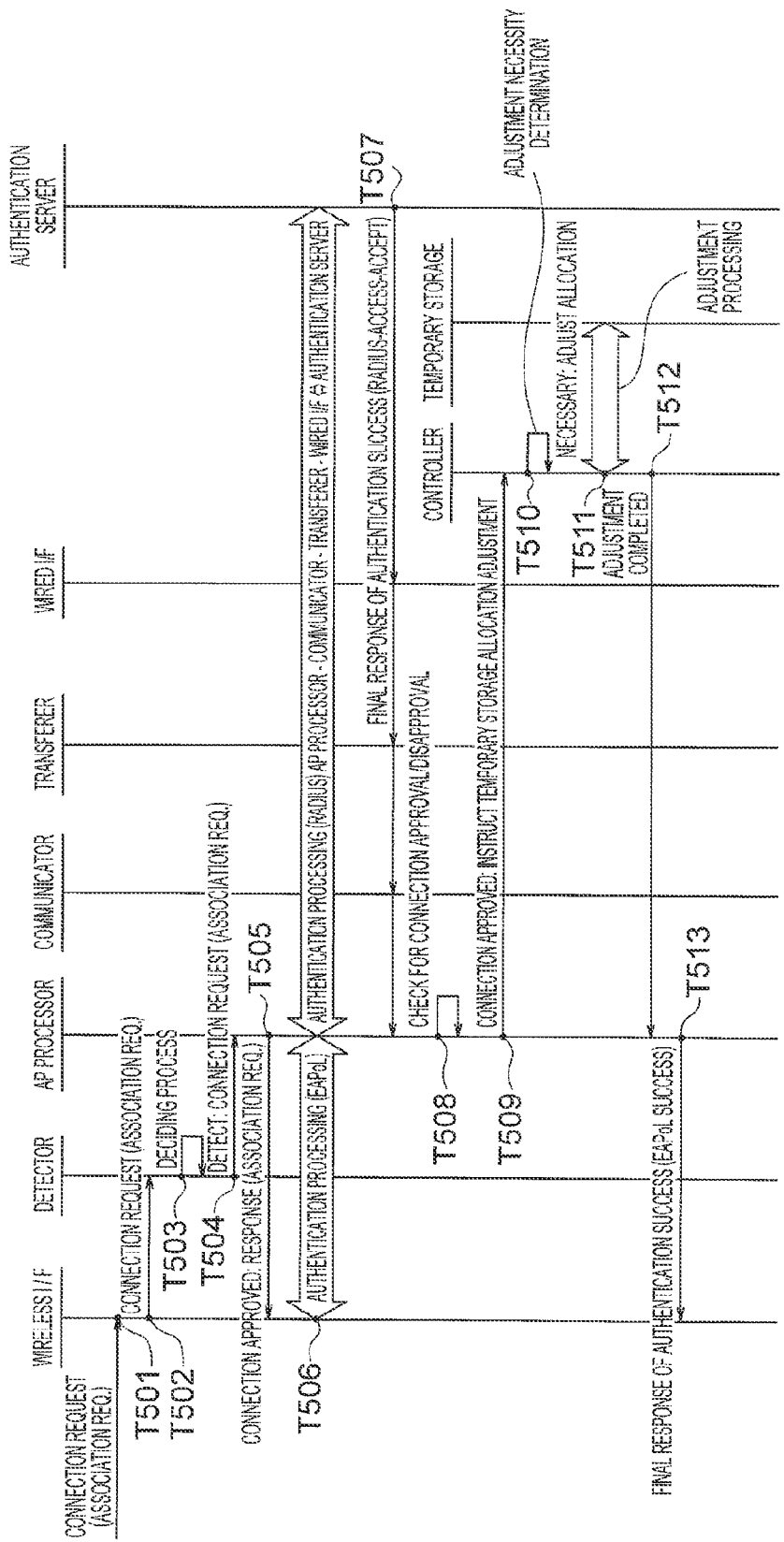
FIG. 12 is a sequence diagram showing the flow of processing by the communication system 1b in the modification of the first embodiment.

Next, the operation of the communication system 1b in the modification of the first embodiment will be described with reference to FIG. 12. FIG. 12 is a sequence diagram showing the flow of processing by the communication system 1b in the modification of the first embodiment. Here, as an example, there will be described the case where the wireless terminal 101a transmits a connection request to the access point 10.

The flow of the processing in FIG. 12 is the same as that of the processing in FIG. 7 except in that the authentication processing is transferred to the external authentication server 105, and the allocation of storage areas in the temporary storage 209 is readjusted after analyzing an authentication result transmitted from the authentication server. Specific description will be made below.

The processes of T501 to T504 are the same as the processes of T301 to T304 in FIG. 7, and will not be described.

(T505) The AP processor 208 transmits a response indicating connection approval (Association Response) to the wireless I/F 201 as a response.

(T506) The wireless I/F 201 acquires information necessary for the authentication through wireless communication with the wireless terminal, and the acquired information necessary for the authentication is transferred to the AP processor 208 under the EAPoL (Extensible Authentication Protocol over LAN). Then, the information necessary for the authentication is transferred from the AP processor 208 to the authentication server 105 via the communicator 204, the transferer 202, and the wired I/F 201. Then, the authentication processing (RADIUS: Remote Authentication Dial in User Service) is performed in the authentication server.

(T507) Here, the description will be made below assuming that the authentication is succeeded. The authentication server 105 transmits a final response of the authentication success (RADIUS-Access-Accept) to the AP processor 208 as a response.

(T508) The AP processor 208 inspects this final response of the authentication success to determine connection approval/disapproval. Here, it is assumed that connection approval is determined.

(T509) Since the AP processor 208 determines that the connection approval is determined, the AP processor 208 instructs the controller 207 to adjust the allocation of the temporary storage 209.

(T510) The controller 207 determines whether the adjustment of a storage area in the temporary storage 209 is needed for the network 104a to which the wireless terminal 101a is to be connected. Specific processing of this determination is the same as the process of T307 in FIG. 7.

(T511) Here, it is assumed that the controller 207 determines that the adjustment of the storage area in the temporary storage 209 is needed. At that point, the controller 207 changes the allocation of storage areas in the temporary storage 209, for example, from that shown in FIG. 5 to that shown in FIG. 6. In such a manner, a new storage area 500a is allocated to the network 104a.

(T512) When the readjustment is completed, the controller 207 notifies the AP processor 208 of the completion of the adjustment.

(T513) The AP processor 208 transmits the final response of the authentication success (EAPoL Success) to the wireless terminal 101a via the wireless I/F 201 as a response.

As described above, the AP processor communicates with the authentication server 105 that authenticates a user. The controller 207 changes the allocation of storage areas also in the case of where the AP processor 208 receives the authentication result of a user of the wireless terminal 101a (e.g., a response indicating an authentication success) from the authentication server 105. Note that, at this point, the controller 207 may not change the allocation of storage areas but may change an object range within which information saved in a storage area can be provided.

As described above, the access point in the first embodiment is a relay device that relays communication between the wireless terminal 101a requesting information and the server 102a providing the requested information. Then, the wireless I/F 201 receives a signal transmitted by the wireless terminal. The AP processor 208 performs the connection management of a network and/or the authentication of a wireless terminal or a user of the wireless terminal using this signal. The controller 207 changes the allocation of storage areas in the accessible temporary storage 209 or a range within which information saved in a storage area can be provided when the AP processor 208 detects, from the signal, the connection or disconnection of a network, management information being information on the authentication of a wireless terminal or a user of the wireless terminal, or a lapse of valid connection time period.

Thereby, in the case where the number of connections to a network is increased from zero to one when a wireless terminal establishes a connection to the network in question, for example, it is possible to allocate a new storage area in the temporary storage 209 to the network in question. In contrast, when a storage area has already been allocated to the network in question, the allocated storage area can be expanded. Thereby, it is possible to increase a probability that information requested by the other wireless terminal connected to the same wireless network is saved in the temporary storage 209, enhancing the use efficiency of the storage area in the temporary storage 209.

In addition, the access point 10 includes the temporary storage 209 to temporarily hold information, which allows information to be read out from the temporary storage 209 when the information is requested from the other wireless terminal. It is thereby possible to be unnecessary to acquire information from the server 102a, allowing transmission delays in the network to be reduced accordingly.

Furthermore, dividing the storage area in the temporary storage 209 implementing caching for each network, user, or group of users, allows pieces of information to be managed for each network, user, or group of users. It is thereby possible to set a restriction on whether pieces of information can be accessed, for each network, user, or group of users.

Note that the controller 207 may determine whether to change the allocation of storage areas in the temporary storage 209 or determine an updating frequency for the allocation of storage areas in the temporary storage 209 in accordance with the frequency of connections or disconnections with a wireless terminal, or the frequency of connections or disconnections in the network.

For example, for a wireless terminal or a network that is found from a past log to frequently repeat connecting and disconnecting, the controller 207 may not perform the readjustment of a storage area in the temporary storage 209 or may reduce the frequency of performing the readjustment.

The controller 207 may change the allocation of a storage area in the temporary storage 209 in accordance with the past connection history of a wireless terminal or a past connection history in a network. For example, when it is assumed from a past log or the like that a specific wireless terminal will be connected, when it is assumed that a specific network will be used, or when it is assumed that there will be many or few users in a specific network, the controller 207 may perform the readjustment of a storage area in the temporary storage 209 on the basis of such tendency.

Specifically, for example, if a wireless terminal proves to be connected from here on, the controller 207 may cause pieces of information included in a storage area allocated to a network to which the wireless terminal is currently connected to be stored in a storage area allocated to a network to which the wireless terminal proves to be connected from here on.

Similarly, if a network proves to be used from here on, the controller 207 may cause pieces of information included in a storage area allocated to a network to which a wireless terminal is currently connected to be stored in a storage area allocated to the network that proves to be used from here on.

If there is a wireless terminal that proves to be connected from here on or a network that proves to be used from here on, and if information for which an acquisition request has been previously made by the wireless terminal or information for which an acquisition request has been previously made over the network remains in a cache, this information may be excluded from deleting objects in the case where the cache is forcibly allocated to the other network.

In addition, a cloud storage of a specified user may be stored in advance in the temporary storage 209. It is thereby possible to enhance the use efficiency of a cache of this specific user.

In addition, if it is known that there are many or few users, the controller 207 may readjust a storage area in the temporary storage 209 after performing weighting in advance using the number of users. For example, the controller 207 may expand the storage area to be allocated as the number of users becomes large. In addition, if the number of users is larger than a threshold value, that is, if it is assumed that the number of users will be large, the controller 207 may reduce the frequency of readjustment.

In addition, the controller 207 may cause the AP processor 208 not to accept a connection to this network or to make the authentication of a wireless terminal that is intended to be connected to this network or the authentication of a user of a wireless terminal unsuccessful, in accordance with the sizes of individual storage areas in the temporary storage 209 or the number of terminals connected to a network.

For example, if a storage area allocated to a specific network becomes too small and it is difficult to reallocate a storage area in the temporary storage 209, or if users are concentrated in a specific network and a storage area in the temporary storage 209 cannot be expanded, the controller 207 may cause the AP processor 208 to stop providing the specific wireless network (e.g., not to advertise the specific SSID thereof) or to make user authentication unsuccessful on purpose.

In addition, in the present embodiment, the controller 207 changes the allocation of storage areas in the temporary storage 209 when the AP processor 208 detects a connection request, a disconnection request, or an authentication success, but the present embodiment is not limited thereto. The controller 207 may count the number of terminals connected to a network at a prescribed cycle or with a predetermined timing and may change the allocation of storage areas in the temporary storage 209 when this number of terminals changes.

Second Embodiment

Next, a second embodiment will be described. In the first embodiment, the access point 10 uses only information cached by itself. In contrast, in the second embodiment, control is performed using information in a cache included in the other access point.

Figure 13:
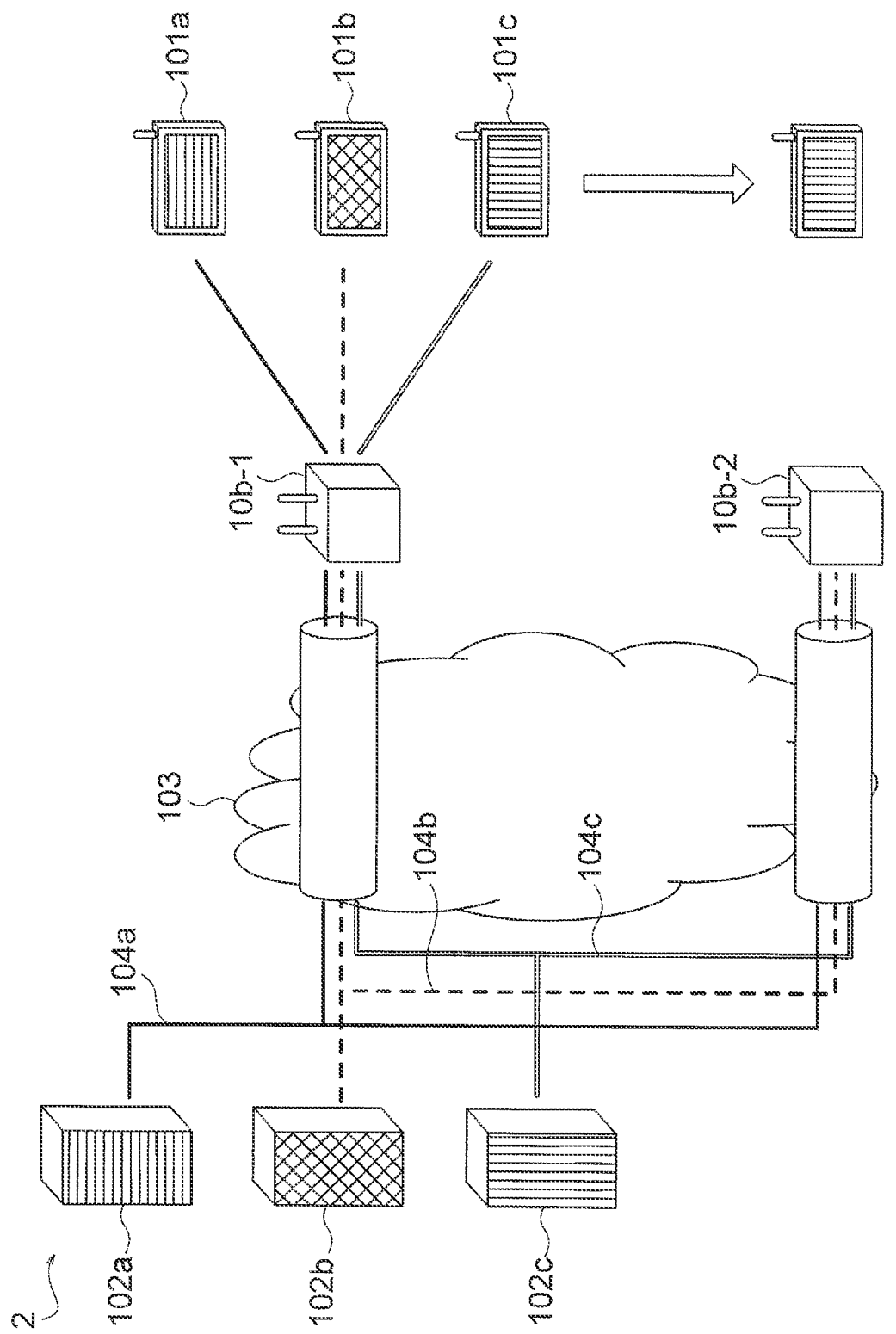
FIG. 13 is a diagram showing the configuration of a communication system 2 in a second embodiment.

FIG. 13 is a diagram showing the configuration of a communication system 2 in the second embodiment. Note that components common to those in FIG. 1 are denoted the same reference characters, and will not be described specifically. As shown in FIG. 13, the configuration of the communication system 2 in the second embodiment is a configuration, as compared with the configuration of the communication system 1 in the first embodiment, in which the access point 10 is changed to an access point 10b-1, and an access point 10b-2 is added.

As shown in FIG. 13, the two access points 10b-1 and 10b-2 are connected to the network 103. The AP processor 208 of the access point 10 recognises each other's existence over the network 103 being a wired network, and recognises that both of them are access points having a caching function. These can be implemented by, for example, extending a node detecting protocol. Hereafter, the access points 10b-1 and 10b-2 are collectively referred to as an access point 10b.

Note that the number of access points is two in FIG. 13 but may be three or more.

Figure 14:
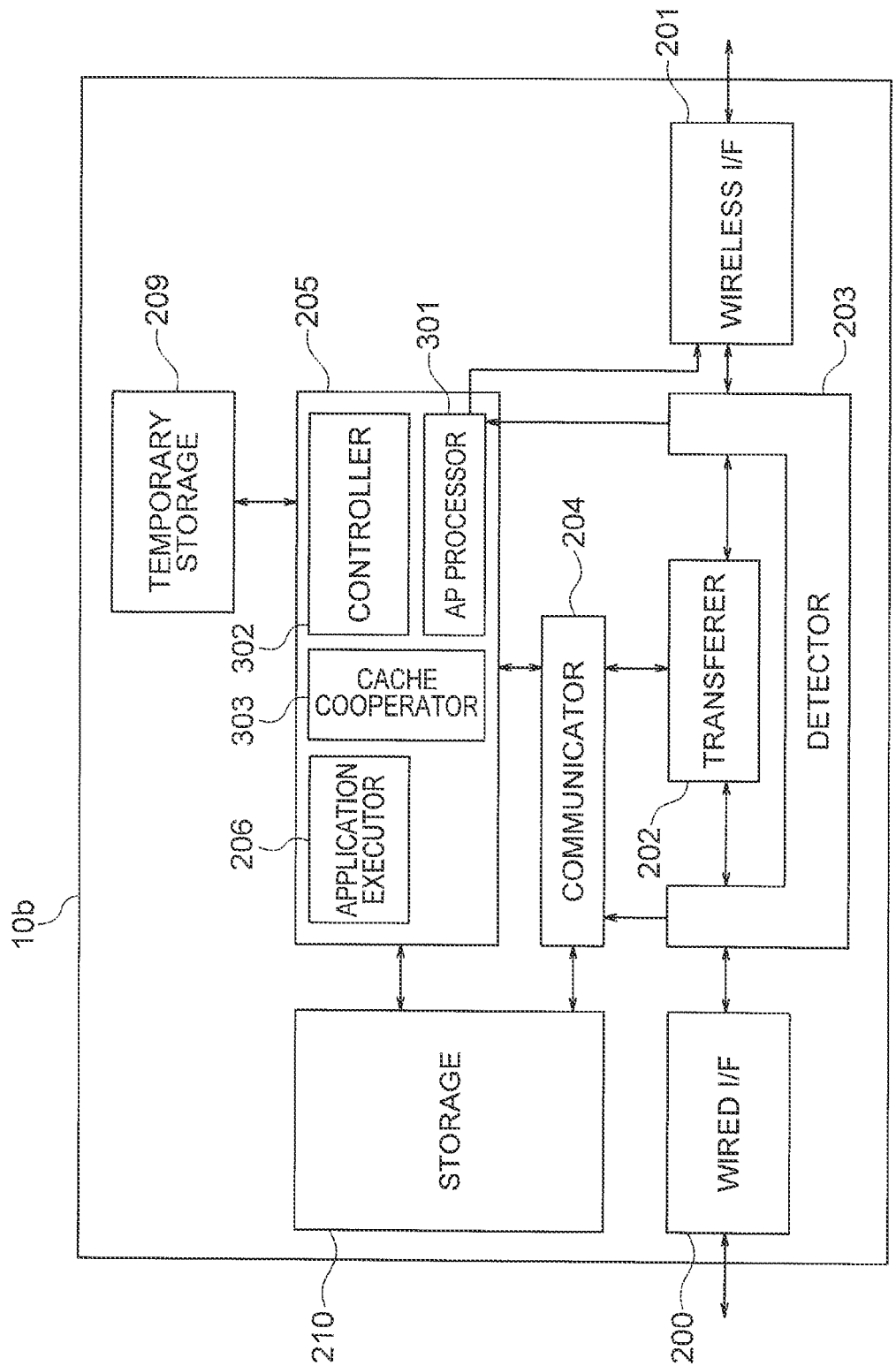
FIG. 14 is a functional block diagram of an access point 10b in the second embodiment.

FIG. 14 is a functional block diagram of the access point 10b in the second embodiment.

Note that components common to those in FIG. 2 are denoted the same reference characters, and will not be described specifically. As shown in FIG. 14, the configuration of the access point 10b in the second embodiment is a configuration, as compared with the configuration of the access point 10 in the first embodiment, in which the AP processor 208 is changed to an AP processor 301, the controller 207 is changed to a controller 302, and a cache cooperator (cooperator) 303 is added.

The AP processor 301 has, in addition to the function of the AP processor 208 in the first embodiment, a function of detecting circumjacent access points, and a function necessary for roaming between access points.

The controller 302 has, in addition to the function of the controller 207 in the first embodiment, a function of not only managing the temporary storage 209 of the access point in question but also grasping information on the temporary storages 209 of circumjacent access points.

The cache cooperator 303 has a function, in response to a request from the other circumjacent access point, of providing information that the access point in question holds in the temporary storage 209 to the other access point and requesting information from another access point.

For example, the cache cooperator 303 identifies a previously-connected relay device being an access point to which a wireless terminal is previously connected. This processing is performed in the case where, for example, when the AP processor 301 detects a connection request from a signal received by the wireless I/F 201, the number of terminals connected to wireless network for which the connection request is made is smaller than a threshold value. Then, the cache cooperator 303 transmits to the identified previously-connected relay device a request signal to request the transmission of information managed by the previously-connected relay device, and causes the information transmitted in response to this request signal to be stored in the temporary storage 209. At this point, for example, if information requested by the wireless terminal is not saved in the temporary storage 209 and this information is managed by the previously-connected relay device, the cache cooperator 303 acquires this information from the previously-connected relay device.

In the example of FIG. 13, it is assumed that the wireless terminal 101c is at this point connected to the access point 10b-1. An operation will be described below, by way of example, about the case where the wireless terminal 101c moves from the wireless communication range of the access point 10b-1 to the wireless communication range of the access point 10b-2.

When the wireless terminal 101c starts moving, a connection is switched from the access point 10b-1 to the access point 10b-2 using a prescribed method. At this point, as described in the first embodiment, the access point 10b-2 performs processing of readjustment areas in the temporary storage 209. If the wireless terminal 101c moves to the access point 10b in the state where the number of terminals connected to the network 104c via the access point 10b is zero, no information is stored in a storage area that is newly allocated for the network 104c. In contrast, it is conceivable that some pieces of information are cached in the access point 10b before the movement. As a result, it is expected that the hit rate of the cache is significantly reduced with the movement, and a user of the wireless terminal 101c feels transmission delays increasing.

Thus, in the present embodiment, to solve this problem, the cache cooperator 303 of the access point 10b-2 to which the wireless terminal 101c is to be connected after the movement (hereafter, also referred to as a post-movement access point) detects the access point 10b-1 to which the wireless terminal 101c is connected before the movement (hereafter, also referred to as a pre-movement access point). Then, the cache cooperator 303 of the access point 10b-2 transmits, as needed, a synchronizing request to request information in the temporary storage 209 of the access point 10b-1 and saves information received in response to this synchronizing request in the temporary storage 209 of the access point in question. This processing will be hereafter referred to as synchronization, because the access point 10b-1 and the access point 10b-2 share information in such a manner. In contrast, conversely, when receiving a synchronizing request from the access point 10b-1, the cache cooperator 303 of the access point 10b-2 transmits information stored in the temporary storage 209 of the access point in question.

At the time of performing this processing, there are roughly two methods of identifying the pre-movement access point 10b-1. A first method is a method in which the cache cooperator 303 of the post-movement access point 10b-2 makes an inquiry to access points on the same LAN. This method can be implemented by, for example, the cache cooperator 303 of the post-movement access point 10b-2 multicasting or broadcasting a searching request that contains the identifier of the connecting wireless terminal 101c (e.g., MAC address) via the wired I/F 200 and by the cache cooperator 303 of the pre-movement access point 10b-1 responding thereto.

A second method is a method in which, taking advantage of the fact that the AP processor 301 of the post-movement access point 10b-2 can acquire from the wireless terminal 101c, through processing in IEEE 802.11r with the movement of the terminal 101c, information to identify an access point to which the wireless terminal 101c is immediately previously connected, the pre-movement access point 10b-1 is identified using the acquired information.

Assume that the pre-movement access point 10b-1 can be identified by either of the methods. The cache cooperator 303 transmits a synchronizing request to the cache cooperator 303 of the pre-movement access point 10b-1. The cache cooperator 303 receiving the request reads out information stored in a storage area allocated to the network 104c from the temporary storage 209 via the controller 302. Then, this cache cooperator 303 transfers the information to the post-movement access point 10b-1 via the wired I/F 200. The cache cooperator 303 of the post-movement access point 10b-1 receiving the transferred information saves the received information in the temporary storage 209 via the controller 302.

The information saved in the temporary storage 209 through this processing is treated similarly to the other information saved in the temporary storage 209 and used as a response corresponding to the request from the wireless terminal 101c. Here, assume the case where the access point 10b-2 receives a new acquisition request from the wireless terminal 101c before the synchronization of the temporary storage 209 is completed.

In this case, the controller 302 receiving an inquiry from application executor 206 detects that synchronization processing is being performed on the temporary storage 209. It is additionally decided whether information requested using the acquisition request has been stored in the temporary storage 209. If the result of the decision indicates that the information has been stored, the information is transmitted to the wireless terminal 101c as a response and the processing is finished. In contrast, if the result of the decision indicates that the information has not been stored, the cache cooperator 303 inquires of the cache cooperator 303 of the pre-movement access point 10b-1 whether the cache cooperator 303 of the pre-movement access point 10b-1 saves the requested information therein.

If desired information is saved in the temporary storage 209 of the pre-movement access point 10b-1, the cache cooperator 303 of the pre-movement access point 10b-1 acquires the information and transmits it to the wireless terminal 101c as a response. If the desired information is not saved in the pre-movement access point 10b-1, either, the application executor 206 requests the information from the server 102c.

This inquiry processing to the pre-movement access point may be finished when the synchronization processing to the temporary storage 209 is completed. Alternatively, this inquiry processing to the pre-movement access point may be finished with crossing-threshold-value timing, which will be described hereafter. The threshold value is, for example, the number or the sizes of pieces of information managed by the pre-movement access point (previously-connected relay device) or a rate at which information requested by a wireless terminal (information request device) is saved in the temporary storage 209, which is an example of a storage device managed by the pre-movement access point (previously-connected relay device).

It is thereby possible to improve the hit rate of the cache to the degree determined by the threshold value.

Furthermore, how many access points to make an inquiry from among access points previously connected is a parameter that an operator can set.

At the time of searching for pre-movement access points on a network, the cache cooperator 303 of the post-movement access point 10b-2 may transmit to a plurality of access points a request signal to request responses. In this case, access points receiving the request may transmit responses containing pieces of time information in establishing a connection such as an association time point, in being in connection, or in performing disconnection processing. This allows the cache cooperator 303 of the post-movement access point 10b-2 to determine an order of connections that the wireless terminal 101c has established in the past based on the pieces of time information.

The above description has been made assuming that processing of making an inquiry to the server 102c being the origin is performed after the cache of the pre-movement access point 10b-1 is checked. In this case, the time for the check is wasted if information is not stored in the pre-movement access point 10b-1. For this reason, the application executor 206 may make an inquiry to the server 102c concurrently with the processing by the cache cooperator 303. In this case, if the cache cooperator 303 of the post-movement access point 10b-2 can receive desired information from the pre-movement access point 10b-1, the acquisition processing of the information from the server 102c may be finished. At this point, for example, the application executor 206 may transmit an RST packet of TCP to the server 102c to close a connection. Note that if a response can be acquired first from the server 102c, the inquiry to the pre-movement access point 10b-1 may be similarly terminated.

Figure 15:
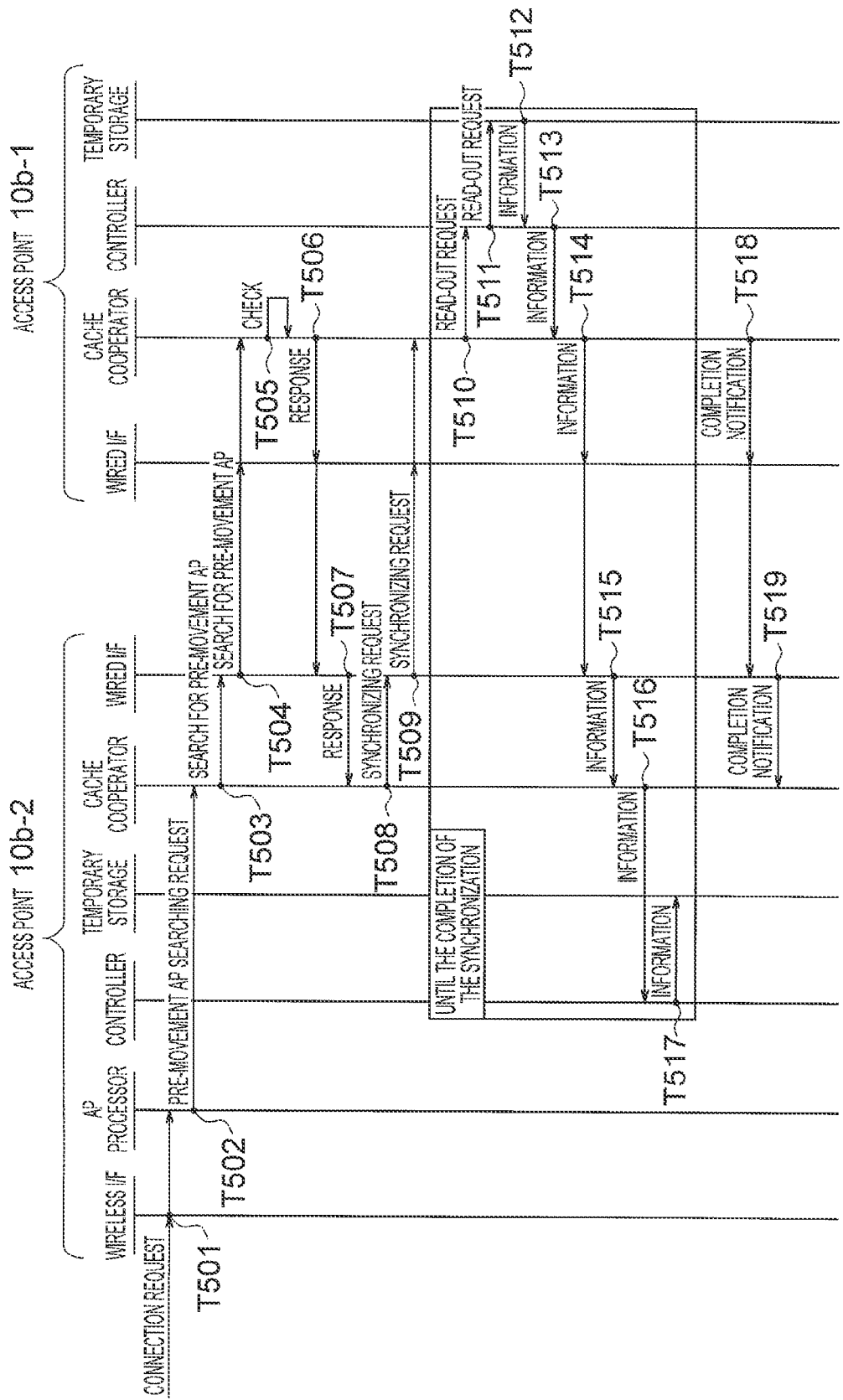
FIG. 15 is a sequence diagram showing the flow of processing by the communication system 2 in the second embodiment.

Next, the flow of the processing in the present embodiment will be described with reference to FIG. 15. FIG. 15 is a sequence diagram showing the flow of the processing by the communication system 2 in the second embodiment. The following processing is processing in the case where the wireless terminal 101c moves from the wireless communication range of the access point 10b-1 to the wireless communication range of the access point 10b-2.

(T501) First, the wireless I/F 201 of the access point 10b-2 acquires a connection request from the wireless terminal 101c and transfers the acquired connection request to the AP processor 301.

(T502) Next, the AP processor 301 of the access point 10b-2 instructs the cache cooperator 303 to search for an access point to which the wireless terminal 101c is connected before the movement.

(T503 and T504) Next, in order to search for the access point to which the wireless terminal 101c is connected before the movement, the cache cooperator 303 of the access point 10b-2 transmits via the wired I/F 200 a request signal to request a response if the wireless terminal 101c has been connected to the access point in the past. The request signal is thereby received by the wired I/F 200 of the access point 10b-1 and transferred to the cache cooperator 303.

(T505) Next, the cache cooperator 303 of the access point 10b-1 checks in response to the request signal whether the wireless terminal 101c has been connected to the access point in question in the past. Here, as an example, it is checked that the wireless terminal 101c has been connected to the access point.

(T506 and T507) Since it is checked that the wireless terminal 101c has been connected to the access point in question, the cache cooperator 303 of the access point 10b-1 transmits a response for the request signal to the access point 10b-2 via the wired I/F 200. The response is thereby transferred to the wired I/F 200 of the access point 10b-2, and further, the response is transferred from the wired I/F 200 to the cache cooperator 303.

(T508 and T509) The cache cooperator 303 of the access point 10b-2 receiving a response transmits a synchronizing request to the access point 10b-1 via the wired I/F 200. The synchronizing request is thereby transferred to the wired I/F 200 of the access point 10b-1, and further, the synchronizing request is transferred from this wired I/F 200 to the cache cooperator 303.

Subsequently, the processes of T510 to T517 are repeated until the synchronization is completed.

(T510) The cache cooperator 303 of the access point 10b-1 receiving the synchronizing request passes a read-out request to the controller 302.

(T511) The controller 302 receiving the read-out request outputs the read-out request to the temporary storage 209.

(T512 to T514) The temporary storage 209 transmits information hit by this read-out request to the controller 302 as a response. This information is transferred from the controller 302 to the cache cooperator 303, and further, this information is transferred to the access point 10b-2 via the wired I/F 200.

(T515 and T516) This information, after being received by the wired I/F 200 of the access point 10b-2, is transferred to the cache cooperator 303 and the controller 302.

(T517) The controller 302 receiving this information saves this information in the temporary storage 209.

(T518 and T519) When the synchronization is completed by repeating the processes of T510 to T517, the cache cooperator 303 of the access point 10b-1 notifies the cache cooperator 303 of the access point 10b-2 of the completion of the synchronization via the wired I/F 200.

As described above, in the second embodiment, the access point 10b-2 is connected to the other access point 10b-1 via the network 103. Then, the cache cooperator 303 of the access point 10b-2 identifies a pre-movement access point (previously-connected relay device) being an access point to which the wireless terminal 101c is previously connected, transmits to this identified pre-movement access point a request signal to request to transmit information managed by the pre-movement access point, and causes the information transmitted in response to this request signal to be stored in the temporary storage 209.

The information stored in the temporary storage 209 of the access point 10b-1 is thereby stored in the temporary storage 209 of the access point 10b-2, which allows the hit rate of the cache of the access point 10b-2 to be improved.

Note that the above description in the second embodiment has been made about the case where the wireless terminal 101c is connected to the post-movement access point 10b-2 in the state where there is no wireless terminal connected to the network 104c of the post-movement access point 10b-2. If some wireless terminals have already been connected to the network 104c of the post-movement access point 10b-2 and/or if it is determined that adequate information is cached in a storage area allocated to the network 104c, the cache cooperator 303 may not perform the synchronization of the information.

For example, if a number of wireless terminals larger than a threshold value (e.g., zero) that is predetermined by the AP processor 301 have already been connected to the network 104c to which the object wireless terminal 101c requests to be connected, the cache cooperator 303 may identify a pre-movement access point (previously-connected relay device) and may decide whether to perform the synchronization of information with the pre-movement access point (previously-connected relay device) using the number or the sizes of pieces of information saved in the temporary storage 209 or a rate at which information requested by the wireless terminal is saved in the temporary storage 209 (or hit rate).

Here, assume that a threshold value is set to the number or the sizes of pieces of information managed by a pre-movement access point, or a ratio at which information requested by the object wireless terminal 101c is saved in a storage device managed by the pre-movement access point. In this assumption, the cache cooperator 303 may decide whether to perform the synchronization of the information with the pre-movement access point (previously-connected relay device) by comparing, for example, the number or the sizes of pieces of information saved in the temporary storage 209 or a ratio at which information requested by the wireless terminal is saved in the temporary storage 209 with the above threshold value. Pieces of information to be an object may be limited when the synchronization is performed. The pieces of information to be an object include, for example, one having a large number of references, one having a long valid time period, one having a short elapsed time from being stored in the cache (in order to synchronize only new pieces of information), one not having been referred to (by a terminal to be an object) yet, and the like. These limitations can be achieved by holding, for each piece of information saved in the cache, information such as the number of references, an term of validity time, a storing time point, and a reference presence/absence flag for each terminal.

Third Embodiment

Next, a third embodiment will be described. In the first and the second embodiments, the access point has the caching function. In contrast thereto, in the third embodiment, a controller that controls the access point has a caching function.

Figure 16:
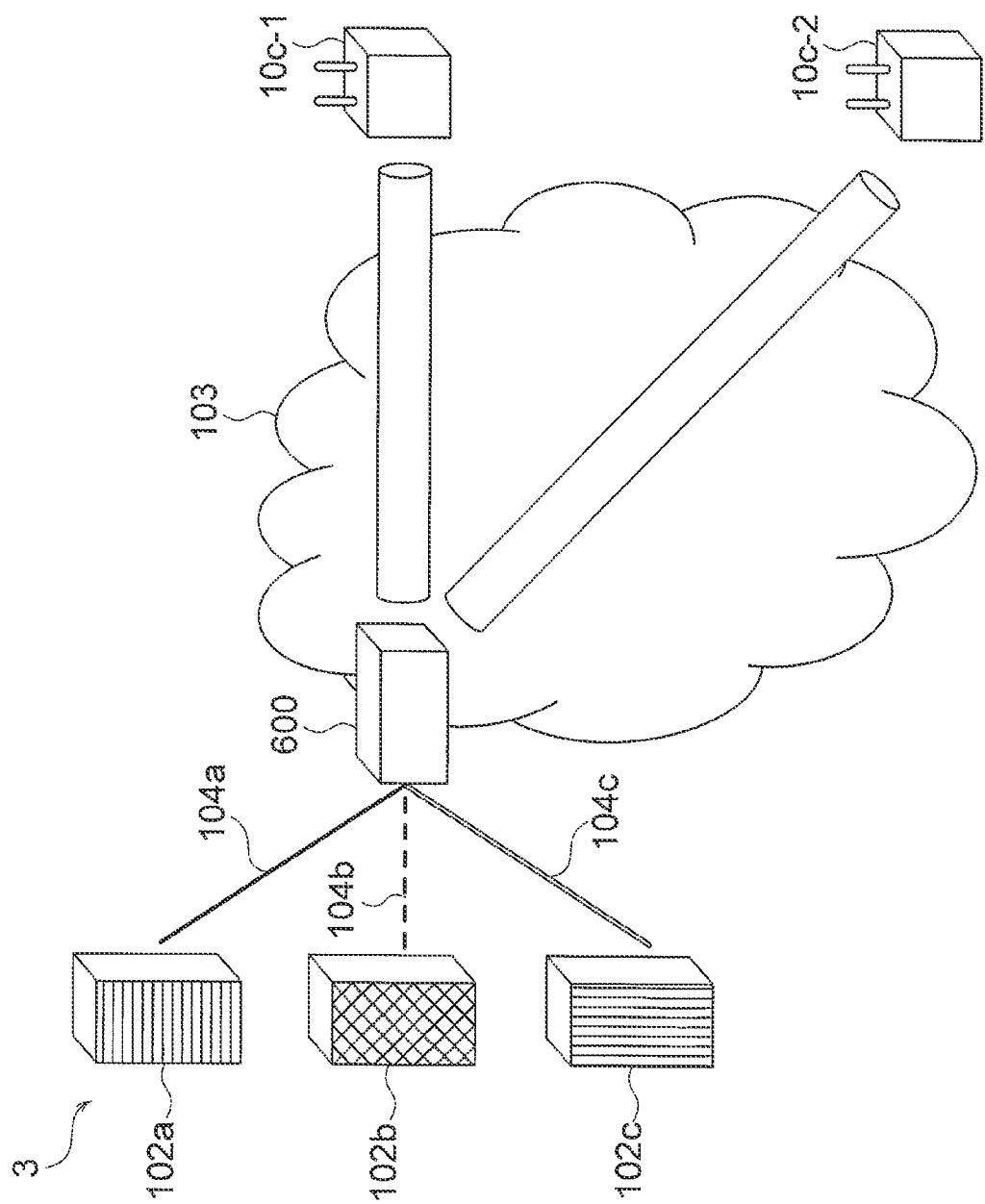
FIG. 16 is a diagram showing a configuration of a communication system 3 in a third embodiment.

FIG. 16 is a diagram showing the configuration of a communication system 3 in the third embodiment. Note that components common to those in FIG. 1 are denoted the same reference characters, and will not be described specifically. As shown in FIG. 16, the configuration of the communication system 3 in the third embodiment is a configuration, as compared with the configuration of the communication system 1 in the first embodiment, in which the access point 10 is changed to an access point 10c-1, and an access point 10c-2 and a controller (control device) 600 are added.

The controller (control device) 600 is connected to the networks 104a to 104c. In addition, the controller (control device) 600 is connected to the access points 10c-1 and 10c-2 over the network 103.

The access points 10c-1 and 10c-2 each construct a tunnel structure with the controller 600 to hide the structure of the network 103, and are in a state of being virtually in a direct connection to the controller 600.

The access points 10c-1 and 10c-2 in the present embodiment are access points that perform processing in the physical layer in wireless communication (hereafter, also referred to as subsequent stage processing) and processing that requires real-time performance among processing in the data link layer (e.g., transmission of a beacon, transmission of Probe Response or ACK).

In contrast, the controller 600 performs processing that does not need real-time performance among the processing in the data link layer in wireless communication (hereafter, referred to as previous stage processing). The previous stage processing includes, for example, bridging between a wired LAN and a wireless LAN, authenticating a user, and controlling access.

In such a configuration, from among frames exchanged by the access points 10c-1 and 10c-2 via the wireless I/F 201, frames that do not need real-time performance are transferred to the controller 600 via the tunnel, and are to be processed by the controller 600. Hereafter, the access points 10c-1 and 10c-2 are collectively referred to as an access point 10c.

Figure 17:
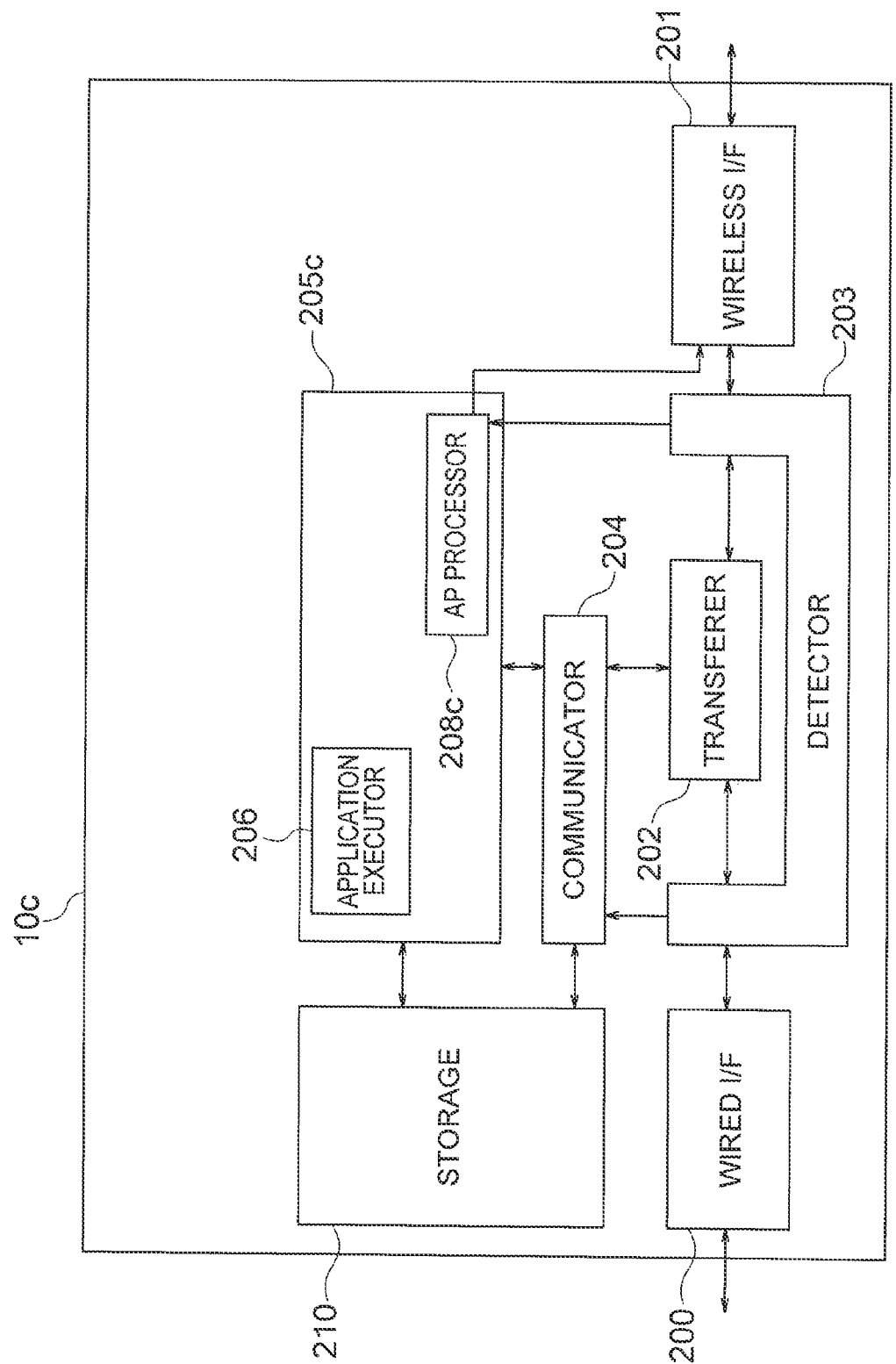
FIG. 17 is a functional block diagram of an access point 10c in the third embodiment.

FIG. 17 is a functional block diagram of the access point 10c in the third embodiment.

Note that components common to those in FIG. 2 are denoted the same reference characters, and will not be described specifically. As shown in FIG. 17, the configuration of the access point 10c in the third embodiment is a configuration, as compared with the configuration of the access point 10 in the first embodiment, the AP processor 208 is changed to an AP processor (first management unit) 208c and the controller 207 is eliminated, following which the processor 205 is changed to a processor 205c and the temporary storage 209 is eliminated.

The AP processor (first management unit) 208c performs connection management of a network using a signal received by wireless I/F 201. For example, the AP processor 208c performs the processing in the physical layer in wireless communication (subsequent stage processing) and processing that requires real-time performance among the processing in the data link layer (e.g., transmission of a beacon, transmission of Probe Response or ACK).

Figure 18:
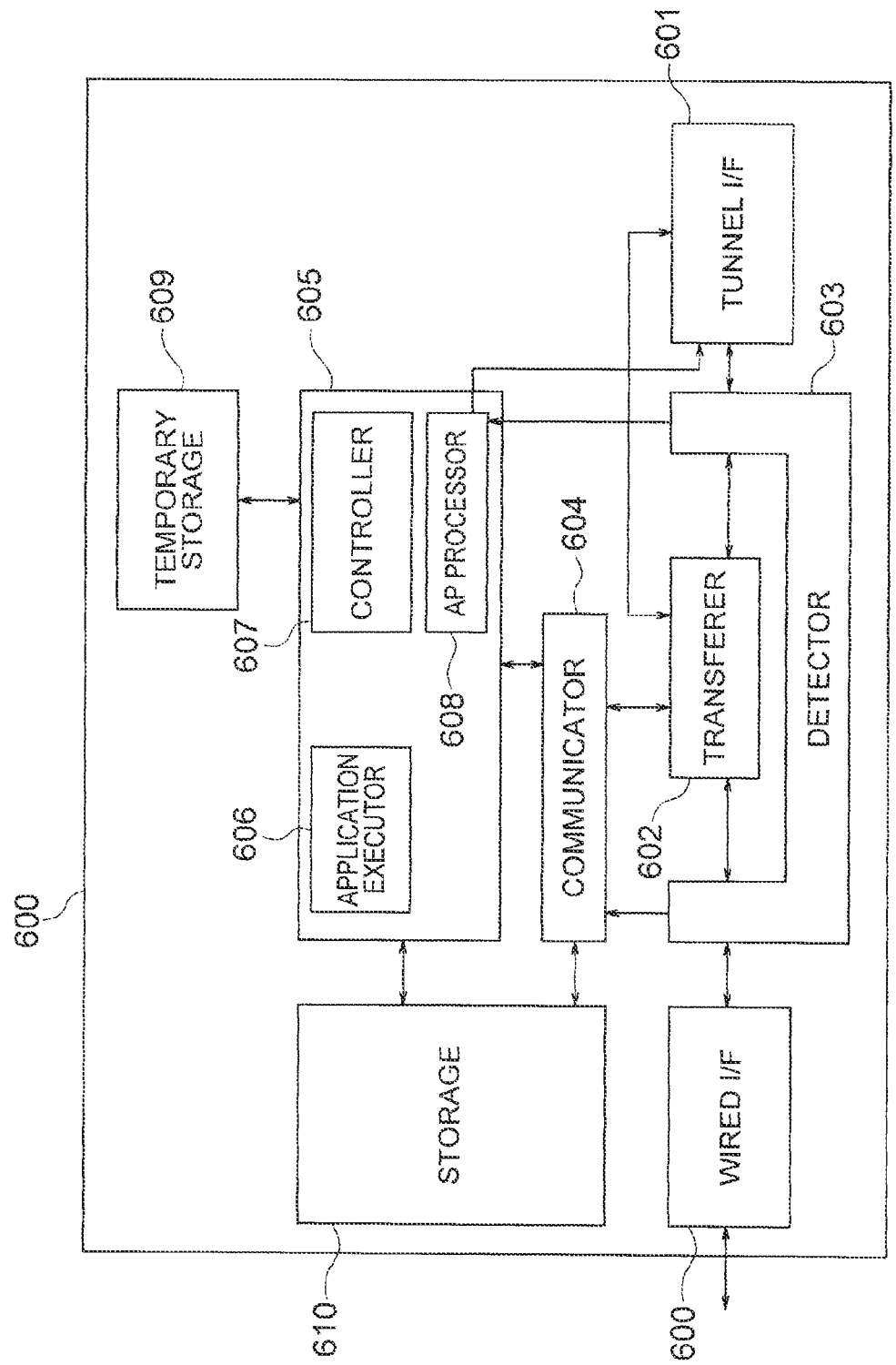
FIG. 18 is a functional block diagram of a controller 600 in the third embodiment.

FIG. 18 is a functional block diagram of the controller 600 in the third embodiment. As shown in FIG. 18, the controller 600 includes a wired I/F 600, a tunnel I/F (second interface) 601, a transferer 602, a detector 603, a communicator 604, a processor 605, a temporary storage 609, and a storage 610. In addition, the processor 605 includes an application executor 606, a controller 607, and an AP processor (second management unit) 608.

The configuration of this controller 600 is equivalent to a configuration in which, from the configuration of the access point 10 described in the first embodiment, the wireless I/F 201 is eliminated and the tunnel I/F 601 is added. The wired I/F 600, the transferer 602, the detector 603, the communicator 604, the temporary storage 609, and the storage 610 have functions similar to those of the wired I/F 200, the transferer 202, the detector 203, the communicator 204, the temporary storage 209, and the storage 210 in the first embodiment, respectively, and will not be described in detail.

Note that this configuration of the controller 600 in the third embodiment shown in FIG. 18 includes only one wired I/F but may include a plurality of wired I/Fs.

The wired I/F 600, the tunnel I/F 601, the transferer 602, the detector 603, the communicator 604, and the processor 605 can be implemented by circuitry such as a processor or an integrated circuit. Each circuitry which implements the wired I/F 600, the wireless I/F 601, the transferer 602, the detector 603, the communicator 604, and the processor 605 may be different physical circuitry, or all or a part of them may be same physical circuitry.

The tunnel I/F 601 is a virtual interface that is implemented by software. The wired I/F 200 of the access point 10c encapsulates data in the UDP/IP and transmits the data to the controller 600. The tunnel I/F 601 receives data encapsulated in UDP/IP and transmitted from the access point 10c and decapsulates the data in the UDP/IP to restore the original data. Conversely, the tunnel I/F 601 encapsulates data in the UDP/IP and transmits the data to the access point 10*c*. In this case, the wired I/F 200 of the access point 10*c* receives the data encapsulated in the UDP/IP and decapsulates the data to restore the original data.

The AP processor (second management unit) 608 authenticates a wireless terminal or a user of the wireless terminal using a signal restored by the tunnel I/F 601. For example, the AP processor (second management unit) 608 performs the processing that does not need real-time performance among processing in the data link layer in wireless communication (previous stage processing). As described above, the previous stage processing includes, for example, bridging between a wired LAN and a wireless LAN, authenticating a user, and controlling access.

The operation of the controller 600 in the present embodiment is the same as that of the access point 10 in the first embodiment except in that wireless frames are exchanged via the tunnel I/F 601, and will not be described in detail.

Note that the communication system 3 in the third embodiment may include an authentication server, and the case of using the authentication server is similarly applicable as with the first embodiment.

As described above, the communication system 3 in the third embodiment forms a plurality of networks, and includes the access point 10*c* that relays signals between a wireless terminal connected to the same network and a server, and the controller 600 that relays the signals between the access point 10*c* and the wireless terminal.

Then, the access point 10*c* includes the wireless I/F (first interface) 201 that receives a signal transmitted by the wireless terminal, and the AP processor (first management unit) 208*c* that performs the connection management of a network using the signal.

Then, the controller 600 includes the tunnel I/F (second interface) 601, the AP processor (second management unit) 608, and the controller 607. The tunnel I/F (second interface) 601 acquires a signal received by the wireless I/F 201. The AP processor 608 (second management unit) authenticates a wireless terminal or a user of the wireless terminal using the signal.

Then, when the AP processor (first management unit) 208 detects, from the signal, information on the connection or disconnection of the network, or a lapse of a valid connection time period, or when the AP processor (second management unit) 608 detects information on the authentication of the wireless terminal or a user of the wireless terminal, the controller 607 changes the allocation of storage areas in the temporary storage 609 being an accessible storage device, or an available object range within which information saved in the storage area can be provided.

Thereby, in the case where the number of connections to a network is increased from zero to one when a wireless terminal establishes a connection to the network in question, for example, it is possible to allocate a new storage area in the temporary storage 609 to the network in question. In contrast, when a storage area has already been allocated to the network in question, the allocated storage area can be expanded. Thereby, it is possible to increase a probability that information requested by the other wireless terminal connected to the same wireless network is saved in the temporary storage 609, enhancing the use efficiency of the storage area in the temporary storage 609.

In addition, the controller 600 is connected to the plurality of access points 10*c*-1 and 10*c*-2. This enables the controller 600 to cache information requested via the plurality of access points 10*c*-1 and 10*c*-2 in the temporary storage 609.

It is thereby highly probable that more pieces of information are saved in the temporary storage 609 of the controller 600 than pieces of information saved in the temporary storage 209 of the access point 10 in the first embodiment, and it can be expected that the hit rate of the cache is improved as compared with the first embodiment.

Fourth Embodiment

Next, a fourth embodiment will be described. In the third embodiment, the network 103 includes one controller 600. In contrast thereto, in the fourth embodiment, there are a plurality of controllers in the network 103, and as described in the second embodiment, the cache cooperating function is performed among the controllers.

Figure 19:
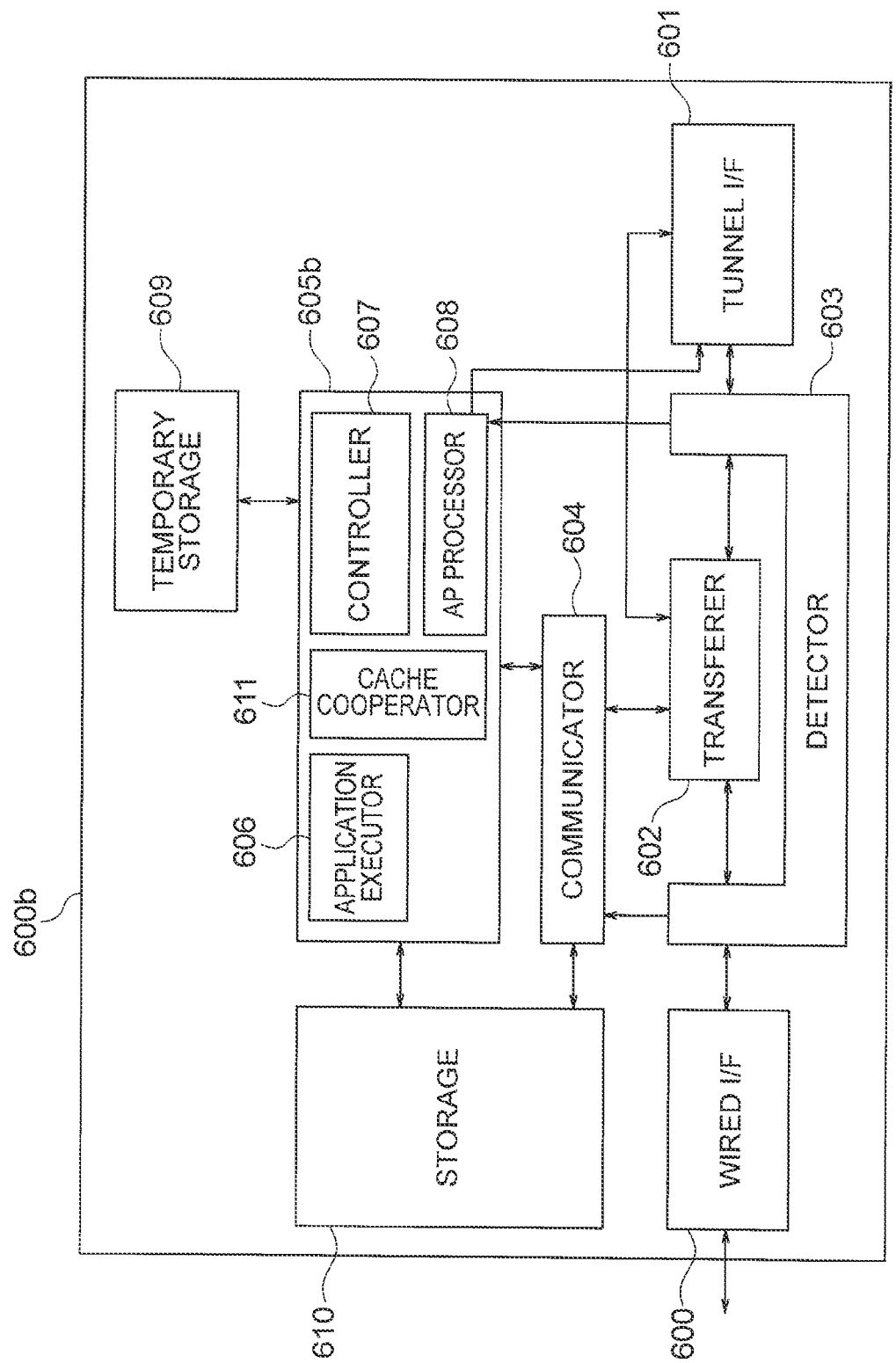
FIG. 19 is a functional block diagram of a controller 600b in a fourth embodiment.

FIG. 19 is a functional block diagram of a controller 600*b* in the fourth embodiment. Note that components common to those in FIG. 18 are denoted the same reference characters, and will not be described specifically. As shown in FIG. 19, the configuration of the controller 600*b* in the fourth embodiment is a configuration, as compared with the configuration of the controller in the third embodiment, in which a cache cooperator 611 is added, following which the processor 605 is changed to a processor 605*b*.

The cache cooperator 611 has a function similar to that of the cache cooperator 311 in the second embodiment, and will not be described in detail.

As described above, the controller 600*b* in the present embodiment is connected to the other controllers over the network 103. Then, the cache cooperator (cooperator) 611 identifies a previously-connected relay device being an access point to which a wireless terminal has been previously connected, transmits to the other control device connected to the identified previously-connected relay device a request signal to request to transmit information managed by the other controller, and causes the information transmitted in response to this request signal to be stored in the temporary storage 609. It is thereby possible to synchronize a cache among the controllers 600*b*.

Fifth Embodiment

Next, a fifth embodiment will be described. In the third and fourth embodiments, the access point performs the subsequent stage processing in wireless communication. For this reason, the access point includes no temporary storage and provides no caching function.

In contrast thereto, in the fifth embodiment, also an access point under the control of a controller to use includes a temporary storage to be able to use a caching function. The configuration of the access point necessary for this is the same as that of the access point in the second embodiment.

The fifth embodiment includes the access point 10*b* shown in FIG. 14 and the controller 600*b* shown in FIG. 19. Then, a cache is synchronized between the access point 10*b* shown in FIG. 14 and the controller 600*b* shown in FIG. 19.

Note that a function of acquiring information from a server may be integrated into a controller. In this case, the information acquiring function is eliminated from the cache controller.

The cache cooperator 303 or 611, in accordance with at least one of the access frequency of object information to be cached, the size of the object information, the moving speed of a wireless terminal, the number of access points connected to the controller 600*b*, and a transmission delay in a network, determines the temporary storage to save the object information from between the temporary storage 609 of the controller 600b and the temporary storage 209 of the access point 10b. Then, the cache cooperator 303 or 611 performs control so as to save the object information in the determined temporary storage.

For example, the cache cooperator 303 or 611 may store information that is accessed at a frequency higher than a prescribed frequency in the access point 10b and may store information that is accessed only at a frequency lower than or equal to the prescribed frequency in the controller 600b. By storing frequently accessed information in the access point 10b in such a manner, it is possible to reduce the amount of communications traffic.

Alternatively, the cache cooperator 303 or 611 may cache a file the size of which to be cached is larger than a prescribed size in the controller 600b and may cache a file the size of which is smaller than or equal to the prescribed size in the access point 10b. It is thereby possible to reduce the capacity of the temporary storage 209 held by the access point 10b, enabling the reduction of cost of the access point 10b. In contrast, if the amount of transfer is intended to be reduced, in contrast to the above description, a file larger than the prescribed size may be held in the access point 10b, and a file having a smaller size may be held in the controller 600b, although the size of the temporary storage 209 necessary for the access point 10b may be increased.

Alternatively, if the moving speed of a wireless terminal is higher than a prescribed speed, the download or upload of information may not be completed while the wireless terminal stays within the communication range of the access point 10b, and thus the cache cooperator 303 or 611 may cache information preferentially in the controller 600b. In contrast, if the moving speed of the wireless terminal is lower than or equal to the prescribed speed, the cache cooperator 303 or 611 may cache information preferentially in the access point 10b.

Alternatively, if the number of access points connected to the controller 600b is larger than a prescribed number, a load on the controller 600b becomes heavy, and thus the cache cooperator 303 or 611 may cache information in the access point 10b. It is thereby possible to prevent the load on the controller 600b from being excessively heavy.

In contrast, if the number of access points connected to the controller 600b is smaller than or equal to the prescribed number, the cache cooperator 303 or 611 may cache information preferentially in the controller 600b.

For example, if a transmission delay in a network is longer than a prescribed amount of delay, the cache cooperator 303 or 611 may cache information preferentially in the access point 10b. This enables a wireless terminal to shorten a time taken to acquire information. In contrast, if the transmission delay in the network is shorter than or equal to the prescribed amount of delay, the cache cooperator 303 or 611 may cache information preferentially in the controller 600b.

Still further, combining the above-described matters, for example, if the distance between the access point 10b and the controller 600b is longer a prescribed distance or if the number of access points connected to the controller 600b is larger than a prescribed number, the cache cooperator 303 or 611 may cache information that is accessed at a frequency higher than a prescribed frequency in the access point 10b. In contrast, the cache cooperator 303 or 611 may cache information that is accessed at a frequency lower than or equal to the prescribed frequency in the controller 600b.

Thereby, in the case where a distance is such long that it takes a long time to acquire information, since frequently accessed information is stored in an access point, it is possible to shorten a time taken to acquire information. In the case where a load on a controller is heavy, since frequently accessed information is stored in an access point, it is possible to reduce the load on the controller and to shorten a time taken to acquire information.

In addition, for example, if a transmission delay in a network is longer than a prescribed amount of delay, and the moving speed of a wireless terminal is higher than a prescribed speed, the acquisition of object information from the controller 600b may not be completed while the wireless terminal stays within the wireless communication range of the access point 10b. Therefore, in this case, the cache cooperator 303 or 611 may cache the object information in the access point 10b. It is thereby possible to increase a probability that the wireless terminal acquires the object information while the wireless terminal stays within the wireless communication range of the access point 10b. In contrast, otherwise, the cache cooperator 303 or 611 may cache the object information in the controller 600b.

In contrast, the controller 600b recognises that the wireless terminal is moving between access points. For this reason, the processing of "searching for a pre-movement access point" performed in the second embodiment may be replaced with processing of "obtaining information on the pre-movement access point from the controller 600b".

In contrast, the wireless terminal may obtain information from, in addition to the pre-movement access point, the controller 600b. As with the case described in the second embodiment, it may take a long time to check in turn access points and controllers to be a candidate of inquiry, the wireless terminal may request information at once using anycast (or broadcast), and thereafter obtain a response from one specific access point or controller. Alternatively, the wireless terminal may request information using a plurality of network connections simultaneously, and select a response that is first obtained. The detail of these operations can be inferred from the embodiments thus far, and will not be described.

Sixth Embodiment

Next, a sixth embodiment will be described. The embodiments thus far have been described about the cooperation or sharing among the caching functions that the access point or the controller has. However, this function can cooperate with a caching function or a storage function that the other kind of device has. In the present embodiment, there will be described the cooperation with an information processing apparatus (e.g., caching device and storage device) that exists in a network, the information processing apparatus having a function of managing information.

Figure 20:
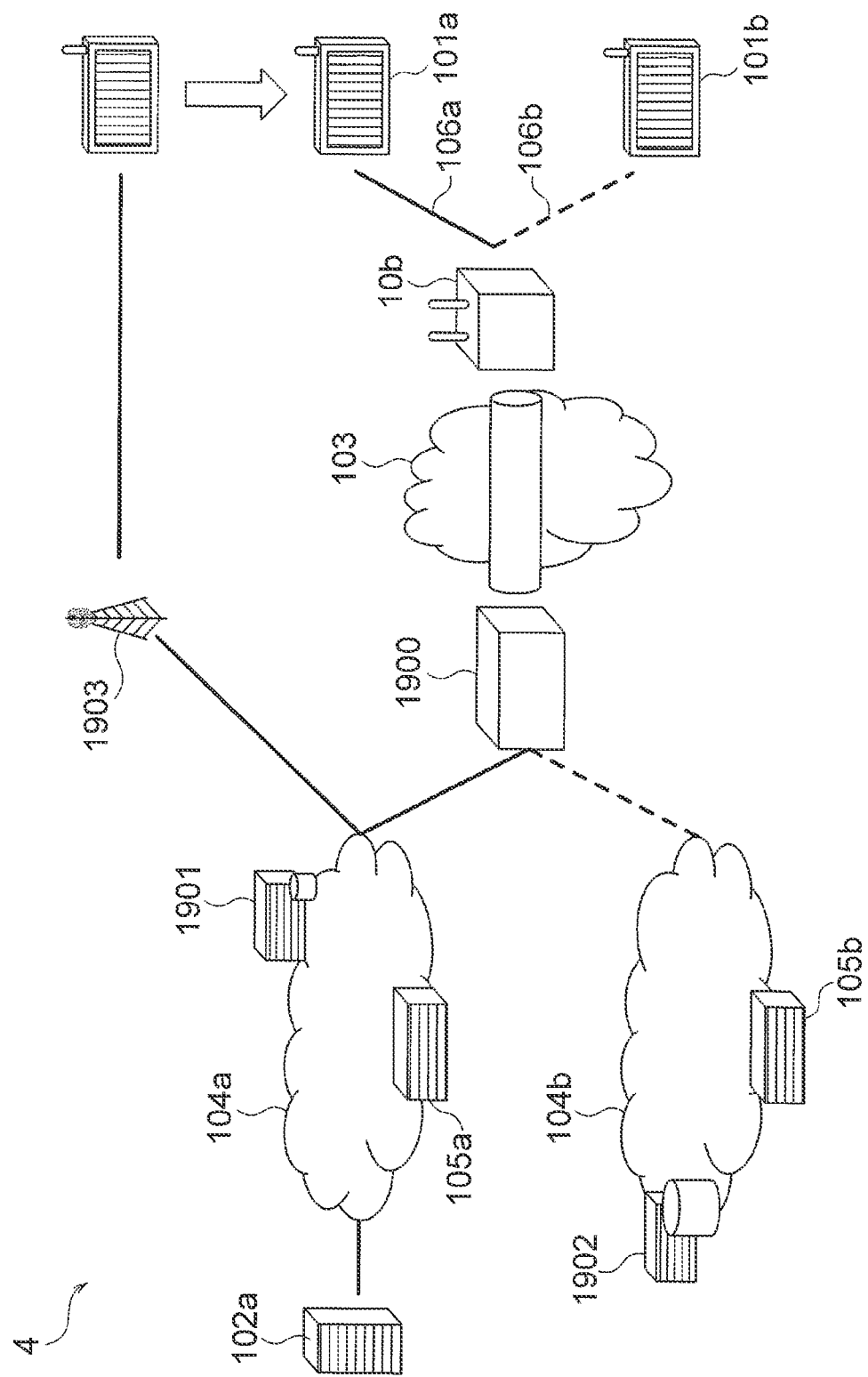
FIG. 20 is a diagram showing a configuration of a communication system 4 in a sixth embodiment.

FIG. 20 is a diagram showing the configuration of a communication system 4 in the sixth embodiment. Note that components common to those in FIG. 1 are denoted the same reference characters, and will not be described specifically. As shown in FIG. 20, the configuration of the communication system 4 in the sixth embodiment is a configuration, as compared with the configuration of the communication system 1 in the first embodiment, in which the access point 10 is changed to the access point 10b, a controller (control device) 1900, authentication servers 105a and 105b, a caching device 1901, a storage device 1902, and a base station 1903 are added, and the wireless terminal 101c, and the servers 102b and 102c are eliminated.

As with the embodiments thus far, the access point 10b provides a plurality of networks, a network 106a and a network 106b, as an example. Here, the network 106a and the network 106*b* are wireless LANs (WLANs). The configuration of the access point 10*b* is similar to that of the access point 10*b* in the second embodiment shown in FIG. 14, but the function of the cache cooperator 303 is different from the function of the cache cooperator 303 in the second embodiment.

The controller (control device) 1900 has a configuration similar to that of the controller 600*b* in the fourth embodiment shown in FIG. 19, but the function of the cache cooperator 611 is different from the function of the cache cooperator 611 in the fourth embodiment. In addition, the AP processor 608 of the controller (control device) 1900 has the function of the controller described in the embodiments thus far, and further has a function of relay, such that the authentication processing performed with the wireless terminal 101*a* or 101*b* is performed with the authentication server 105*a* or 105*b*, which is suitable for a network to be connected.

The access point 10*b* or the controller 1900 is connected to the caching device 1901 or the storage device 1902, which is an example of an information processing apparatus, over the network 104*a* or the network 104*b*, which is an example of a second network different from the networks 106*a* and 106*b*. The cache cooperator 303 (or 611) transmits a request signal to request to transmit information managed by the caching device 1901 or the storage device 1902 and causes information transmitted in response to the request signal to be stored in the temporary storage 209 (or 609).

The networks include the authentication server 105*a* and the authentication server 105*b* installed, respectively.

The authentication servers 105*a* and 105*b* determine connection approval/disapproval to a wireless terminal that makes a request to establish a connection to the networks.

To the network 104*a*, the server device 102*a* and the caching device 1901 are also connected.

The server device 102*a* may be a server in an enterprise or may be a server on the Internet broadly providing information.

The caching device 1901 is a cache server that caches information. The caching device 1901 is opened only to terminals using a specific network from the nature thereof, but may be either an on-premises server or a server on the Internet.

In addition, it is assumed that the network 104*a* is connected also to a wide area network such as a cellular network, and the caching device 1901 can provide the effect of caching also to access from the cellular network.

To the network 104*b*, the storage device 1902 is connected. This storage device 1902 is a storage server that provides an online storage service, and manages and saves information for each contracted customer.

The base station 1903 provides the cellular network being a public wireless communication network.

The following description will be made assuming that the controller 1900 or the access point 10*b* has the caching function, but can be also applied similarly to the case like the fifth embodiment where both of the controller and the access point have the caching function.

(Case of Assuming Roaming Between Cellular Network and WLAN)

There will be described below the operation in the case of assuming roaming from a cellular network provided by the base station 1903 to a WLAN provided by the access point 10*b*.

First, consider the case where the terminal 101*a* switches its connection from the base station 1903 to the access point 10*b*. As with the embodiments thus far, when the connection processing and the authentication processing are completed, the access point 10*b* (or controller 1900) performs the reallocation adjustment processing on cache areas, by which the effect of caching can be brought to communication performed by the terminal 101*a*.

At this point, the access point 10*b* (or controller 1900) of the present application notifies the caching device 1901 that "the authentication is completed by the authentication server 105*a*", and synchronizes the cache contents of the caching device 1901. The caching device 1901 may synchronize a cache as with the cache cooperation between access points in the above-described embodiments. This synchronization enables the state of the cache that effectively functions on the cellular network side to be continuously used in the communication via the access point 10*b*.

Note that, to authenticate the terminal 101*a*, by using authentication information such as EAP-SIM common to the cellular network side, it is possible to seamlessly treat access from both of the networks.

(Synchronizing Personal Information Saved in Cloud Storage)

Next, there will be described the synchronization of personal information saved in a cloud storage or the like. Then, consider the case where the terminal 101*b* is connected to the access point 10*b*. This case is also similar to the embodiments thus far in that the reallocation adjustment processing of cache areas is performed when the terminal 101*b* completes the connection processing and the authentication processing with the access point. The wireless terminal 101*b* the authentication of which is succeeded obtains access permission for the storage device 1902 when authenticated by the authentication server 105*b*.

The terminal 101*b* that obtains the access permission for the storage device 1902 can directly communicate with the storage device 1902 at this point. However, in the case where the number of relaying nodes is large and congestion occurs, or in the case where there is a physical distance from the storage device 1902, adequate input/output (I/O) performance may not be obtained.

To avoid such a situation, the cache cooperator 303 (or cache cooperator 611) of the access point 10*b* (or controller 1900) in the present embodiment checks whether the wireless terminal the authentication of which is completed subscribes a cooperation additional service (in this case, online storage service as an example), and operates so as to cache the information thereon in the temporary storage thereof if the wireless terminal subscribes the service. The cache cooperator 303 (or cache cooperator 611) of the access point 10*b* (or controller 1900) checks for the cooperation additional service following the authentication for connection, and starts the synchronization processing of the information provided by this cooperation additional service if the subscription can be checked. A storage area allocated through this processing may be treated similarly to a storage area, described in the above embodiments, that is allocated for each user.

It is expected that the information saved in the storage device 1902 has a size larger than the cache size of the access point 10*b*, and it may be difficult to synchronize all the pieces of information saved in the storage device 1902. Thus, the cache cooperator 303 (or cache cooperator 611) of the access point 10*b* (or controller 1900) may synchronize only files meeting a specific condition, such as files having high frequencies of use or files having recent updated date times.

In addition, in the case of the storage service, additional information occurs to the cache of the access point 10*b* (or controller 1900), and thus free space may be allocated as of the synchronization processing. Additionally, processing of synchronizing information added to or information updated in the temporary storage 209 (or temporary storage 609) of the access point 10*b* (or controller 1900) with the original server is also required. In other words, this processing is exactly processing of writing back from the access point 10*b* or the controller 1900 to the original server.

This processing may be performed at fixed time intervals. Alternatively, this processing may be performed based on when the uplink of the access point 10*b* (controller 1900) becomes available, when a predetermined time point comes, when the amount of updated information exceeds a predetermined threshold value, when the wireless terminal 101*b* issues an instruction, when the wireless terminal 101*b* detects the disconnection from the network, when a frame indicating that a wireless terminal moves is received from an adjacent access point (controller), and the like.

Note that, to implement a series of processes in the sixth embodiment, authentication information used by the wireless terminal 101*b*, that is, the authentication information on the wireless terminal 101*b* managed by the authentication server 105*b* is assumed to contain information to permit the cooperation with the storage device 1902. This can be implemented by associating account information on a user of the wireless terminal 101*b* with information on a contracted service (in the case of the present embodiment, the online storage service, as an example).

As described above, in the sixth embodiment, the cache cooperator 303 of the access point 10*b* or the cache cooperator 611 of the controller 1900 can synchronize the stored content of the caching device 1901 and the stored content of the storage device 1902 that are provided in a communication range different from a communication range of the access point 10*b*, using the start or the disconnection of wireless communication as a trigger. The access point 10*b* thereby holds the stored content of the caching device 1901 or the storage device 1902, and thus when this stored content is requested from the wireless terminal, information held by the access point 10*b* may only be transmitted as a response, which allows a transmission delay to be reduced and allows the amount of transmission in the network 104*a* or 104*b* to be reduced.

(Supplemental Item 1)

The series of descriptions in the embodiments have been made by way of example about the operation between an access point (base station) (including a controller) and a terminal in wireless communication, but are not limited thereto and can be similarly applied to a wired LAN. That is, the communication system may have a function of detecting a connection state with a wired LAN, a function of authenticating a terminal or a user, and further a function of temporarily storing information provided over a network. At this point, the detection of the connection state may be replaced with the detection of link up/down, and the authentication may be replaced with authentication under IEEE 802.1x or the like. In addition, the wireless access point (base station) may be replaced with a switching hub (the controller is equivalent to an access control device or an authentication server).

(Supplemental Item 2)

The embodiments have been described about the case of using a wireless access point and a controller, but are not limited to the case where both of the devices exist on the same LAN or in the same site. For example, the embodiment may be an embodiment in which the controlling function may exist in a network outside the site and performs control information to be saved in a temporary storage.

In the embodiments, the access point 10, 10*b*, or 10*c* includes the temporary storage 209 but is not limited thereto, and the temporary storage 209 may be one external to the access point 10, 10*b*, or 10*c*, or may be provided outside the access point 10, 10*b*, or 10*c* and connected to the access point 10, 10*b*, or 10*c* over a network. That is, the temporary storage 209 may be a storage device accessible to the access point 10, 10*b*, or 10*c*.

In the embodiments, the controller includes the temporary storage 609 but is not limited thereto, and the temporary storage 609 may be one external to the controller, or may be provided outside the controller and connected to the controller over a network. That is, the temporary storage 609 may be a storage device accessible to the controller.

Note that the above-described various processes relating to the processor of the access point or the processor of the controller in the embodiments may be performed by recording a program to perform the processes of the processor of the access point or the processor of the controller in the embodiments in a computer readable recording medium, causing a computer system to read the program recorded in the recording medium, and causing a processor to execute the program.

Note that, the term "computer system" herein may include an OS or hardware such as peripheral equipment. In addition, if the "computer system" uses a WWW system, a Web site provision environment (or display environment) is also included therein. Furthermore, the "computer-readable storage medium" means a nonvolatile memory such as a flexible disk, a magneto-optical disk, a ROM, and a flash memory, and a portable medium such as a CD-ROM, a storage device such as a hard disk incorporated in the computer system.

Furthermore, the "computer-readable storage medium" includes media for retaining the program for a certain period of time, like a volatile memory (e.g., a DRAM (Dynamic Random Access Memory)) installed inside the computer system being a server or a client with which the program is transmitted via a network such as the internet or via a communication line such as a telephone line. In addition, the program may be transmitted to another computer system from the computer system that stores the program in the storage device or the like thereof via a transmission medium, or by a transmission wave in the transmission medium. Here, the "transmission medium" for transmitting the program means a medium having a function of transmitting information, like a network (communication network) such as the internet or a communication line (communication line) such as a telephone line. In addition, the program may be for implementing part of the above-mentioned function. Furthermore, the program may be so called a difference file (difference program), which implements the above-mentioned function in combination with a program that has already been recorded in the computer system.

The terms used in each embodiment should be interpreted broadly. For example, the term "processor" may encompass a general purpose processor, a central processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "temporary storage" or "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

The term "storage" may generally encompass any device which can memorize data permanently by utilizing magnetic technology, optical technology or non-volatile memory such as an HDD, an optical disc or SSD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A relay device, for connecting plural independent wireless networks and which functions as a wireless access point, for relaying communication between an information request device which requests information and an information providing device which provides requested information, the relay device comprising:
an interface configured to receive a signal transmitted by the information request device;
first circuitry configured to detect, from the signal, a connection request, a disconnection request, or an authentication success; and
second circuitry configured to, when the first circuitry detects the connection request, the disconnection request, or the authentication success, control capacity of storage areas included in a storage device for storing information which is requested by the information request device, sent by the information providing device, and to be sent to the information request device, or an available range of storage for storing the information in the storage device, wherein
a whole storage area in the storage device is divided into a plurality of the storage areas different from one another allocated to the respective networks; and
when the interface receives an acquisition request for information from an information request device belonging to a first network, the second circuitry searches only a storage area that is allocated to the first network for the information requested by the information request device belonging to the first network in order to send the information as a response.

2. The relay device according to claim 1, wherein
the first circuitry is configured to communicate with an authentication device, and
the second circuitry is configured to change the capacity of the storage areas or the available range when the first circuitry receives an authentication success from the authentication device.

3. The relay device according to claim 1, wherein the second circuitry is configured to determine whether to change the capacity of the storage areas in the storage device in consideration an unallocated storage area, an allocation destination of allocated storage area, or a capacity of the allocated storage area.

4. The relay device according to claim 1, wherein
portions of each of the storage areas are allocated to a respective information request device, a respective information request device user, or a respective group of users, and
the second circuitry is configured to change the capacity of the portion of the storage area for each of the information request devices, each of the users of the information request device, or each of the groups of users.

5. The relay device according to claim 1, wherein the second circuitry is configured to change the capacity of the storage areas in accordance with a number of connected terminals in each of the networks or a response rate for information requested by the information request device based on information saved in the storage device.

6. The relay device according to claim 1, wherein the second circuitry is configured to determine whether to change the capacity of the storage areas or an updating frequency of the capacities of the storage areas in accordance with a frequency of connections or disconnections of the information request device or a frequency of network connections or disconnections.

7. The relay device according to claim 1, wherein the second circuitry is configured to change the capacity of the storage areas in accordance with a past connection history of the information request device or a past network connection history.

8. The relay device according to claim 1, wherein, in a case that a part or a whole of the storage area allocated to one network is to be allocated to another network, the second circuitry discards information contained in the part or the whole of the storage area according to a predetermined rule.

9. The relay device according to claim 1, wherein, when a number of terminals connected to a specific network becomes zero, the second circuitry releases a storage area allocated to the specific network.

10. The relay device according to claim 1, wherein the second circuitry is configured to cause the first circuitry not to accept a network connection, or make authentication of the information request device establishing the network connection or authentication of a user of the information request device unsuccessful, in accordance with capacities of individual storage areas in the storage device or a number of network-connected terminals.

11. The relay device according to claim 1, wherein the relay device is connected to another relay device over a second network,
the relay device further comprising third circuitry configured to identify a previously-connected relay device to which a certain information request device has been previously connected, transmit to the previously-connected relay device a request signal to request information managed by the previously-connected relay device, and cause information transmitted in response to the request signal to be stored in the storage device.

12. The relay device according to claim 11, wherein, when information requested by the certain information request device is not saved in the storage device and when the information is managed by the previously-connected relay device, the third circuitry acquires the information from the previously-connected relay device.

13. The relay device according to claim 11, wherein, when information request devices of a number larger than a threshold value have already been connected to a network to which a target information request device requests to connect, the third circuitry identifies the previously-connected relay device, and determines whether to synchronize information with the previously-connected relay device using a number or sizes of pieces of information saved in the storage device, or a response rate for information requested by the certain information request device based on information saved in the storage device.

14. The relay device according to claim 1, wherein the relay device is connected to an information processing apparatus over a second network,
the relay device further comprising third circuitry configured to transmit a request signal for information managed by the information processing apparatus, and cause information transmitted in response to the request signal to be stored in the storage device.

15. A communication system which includes a relay device and a control device, the relay device, configured to connect plural independent wireless networks and which operates as a wireless access point, for relaying a signal between an information request device and an information processing apparatus, and the control device configured to relay the signal between the relay device and the information request device, wherein
the relay device includes:
a first interface configured to receive a signal transmitted by the information request device; and
first circuitry configured to detect, from the signal, a connection request, a disconnection request, or an authentication success, and
the control device includes:
a second interface configured to acquire the signal received by the first interface;
second circuitry configured to authenticate, using the signal, the information request device or a user of the information request device; and
third circuitry configured to, when the first circuitry detects the connection request, the disconnection request or the authentication request, change capacity of storage areas in a storage device for storing information which is requested by the information request device, sent by the information providing device and to be sent to the information request device, or an available range of storage for storing the information in the storage device, wherein
a whole storage area in the storage device is divided into a plurality of the storage areas different from one another allocated to the respective networks; and
when the first interface receives an acquisition request for information from an information request device belonging to a first network, the second circuitry searches only a storage area that is allocated to the first network for the information requested by the information request device belonging to the first network in order to send the information as a response.

16. The communication system according to claim 15, wherein the communication system is connected to another control device over a second network, and
the communication system further comprises fourth circuitry configured to identify a previously-connected relay device to which a certain information request device has been previously connected, transmit to the other control device connected to the previously-connected relay device a request signal to request to transmit information managed by the other control device, and cause information transmitted in response to the request signal to be stored in the storage device.

17. A relay method performed by a relay device, configured to connect plural independent wireless networks and which operates as a wireless access point, relay communication between an information request device which requests information and an information providing device which provides requested information, the relay method comprising:
receiving a signal transmitted by the information request device;
detecting, from the signal, a connection request, a disconnection request, or an authentication success controlling, when the connection request, the disconnection request or the authentication success is detected, capacity of storage areas included in a storage device for storing information which is requested by the information request device, sent by the information providing device and to be sent to the information request device, or an available range of storage for storing the information in the storage device, wherein
a whole storage area in the storage device is divided into a plurality of the storage areas different from one another allocated to the respective networks; and
when an acquisition request for information from an information request device belonging to a first network is received, the searching searches only a storage area that is allocated to the first network for the information requested by the information request device belonging to the first network in order to send the information as a response.

* * * * *